United States Patent
Koskinen et al.

(10) Patent No.: US 9,560,652 B2
(45) Date of Patent: Jan. 31, 2017

(54) PROVIDING A RADIO BEARER ON A PLURALITY OF COMPONENT CARRIERS

(75) Inventors: Henri Markus Koskinen, Espoo (FI); Jani Matti Johannes Moilanen, Helsinki (FI); Claudio Rosa, Randers (DK); Chunli Wu, Beijing (CN)

(73) Assignee: Nokia Solutions and Networks Oy, Espoo (FI)

( * ) Notice: Subject to any disclaimer, the term of this patent is extended or adjusted under 35 U.S.C. 154(b) by 139 days.

(21) Appl. No.: 14/371,206

(22) PCT Filed: Jan. 10, 2012

(86) PCT No.: PCT/EP2012/050315
§ 371 (c)(1),
(2), (4) Date: Jul. 9, 2014

(87) PCT Pub. No.: WO2013/104413
PCT Pub. Date: Jul. 18, 2013

(65) Prior Publication Data
US 2015/0016367 A1    Jan. 15, 2015

(51) Int. Cl.
*H04W 72/04* (2009.01)
*H04L 5/00* (2006.01)

(52) U.S. Cl.
CPC .......... *H04W 72/0453* (2013.01); *H04L 5/001* (2013.01); *H04L 5/0023* (2013.01);
(Continued)

(58) Field of Classification Search
CPC ...... H04W 28/08; H04W 36/08; H04W 36/28; H04W 72/0453; H04W 76/02; H04W 76/06; H04L 5/001; H04L 5/0055; H04L 5/0057; H04L 29/10; H04B 7/15592; H04B 7/002; H04B 7/15
See application file for complete search history.

(56) References Cited

U.S. PATENT DOCUMENTS

| | | | |
|---|---|---|---|
| 8,498,666 B2* | 7/2013 | Sebire | H04L 5/001 370/351 |
| 8,743,799 B2* | 6/2014 | Chmiel | H04L 5/001 370/329 |

(Continued)

FOREIGN PATENT DOCUMENTS

| | | |
|---|---|---|
| EP | 2 230 872 A1 | 9/2010 |
| WO | WO 2011/100492 A1 | 8/2011 |

(Continued)

OTHER PUBLICATIONS

3GPP TSG-RAN WG2 #73, Taipei, Taiwan, Feb. 21-25, 2011, Tdoc R2-111352, "Limitation of Sequence Numbers and Length Fields in LTE Rel-10", Ericsson, ST-Ericsson, 4 pgs.

*Primary Examiner* — Brian O'Connor
(74) *Attorney, Agent, or Firm* — Harrington & Smith

(57) ABSTRACT

There is provided a radio bearer to user equipment on a first component carrier by a first network node and on a second component carrier via a second network node connecting to the first network node. A control plane configuration message is transmitted that indicates an uplink component carrier of a network node that terminates an air-interface protocol linked to the first and/or the second component carrier. The uplink component carrier (it can be more than one) is then used for uplink transmission of data units that include information about reception of data units of the air-interface protocol.

33 Claims, 5 Drawing Sheets

(52) U.S. Cl.
CPC .......... *H04L 5/0053* (2013.01); *H04L 5/0055* (2013.01); *H04L 5/0057* (2013.01)

(56) References Cited

U.S. PATENT DOCUMENTS

| | | | | |
|---|---|---|---|---|
| 8,837,358 B2* | 9/2014 | Lunttila | ................ | H04L 1/1607 370/328 |
| 8,855,132 B2* | 10/2014 | Lohr | ................ | H04L 1/0026 370/431 |
| 8,995,370 B2* | 3/2015 | Pelletier | ................ | H04W 72/0453 370/328 |
| 9,007,933 B2* | 4/2015 | Wu | ................ | H04W 72/0406 370/252 |
| 9,083,517 B2* | 7/2015 | Chen | ................ | H04L 5/0023 |
| 9,118,452 B2* | 8/2015 | Park | ................ | H04L 5/001 |
| 9,125,197 B2* | 9/2015 | Liao | ................ | H04W 36/08 |
| 9,258,809 B2* | 2/2016 | Liao | ................ | H04W 36/08 |
| 9,351,293 B2* | 5/2016 | Chen | ................ | H04L 5/001 |
| 2011/0134831 A1 | 6/2011 | Pirskanen | ................ | 370/328 |
| 2011/0149913 A1* | 6/2011 | Park | ................ | H04W 36/0083 370/332 |
| 2011/0275359 A1* | 11/2011 | Sebire | ................ | H04L 5/001 455/422.1 |
| 2013/0044654 A1* | 2/2013 | Chen | ................ | H04L 5/0023 370/280 |
| 2013/0176988 A1* | 7/2013 | Wang | ................ | H04W 28/08 370/331 |
| 2013/0215772 A1* | 8/2013 | Kaur | ................ | H04W 36/0072 370/252 |
| 2013/0343261 A1* | 12/2013 | Gonsa | ................ | H04B 7/2606 370/315 |
| 2015/0296536 A1* | 10/2015 | Park | ................ | H04L 5/001 370/329 |

FOREIGN PATENT DOCUMENTS

| | | |
|---|---|---|
| WO | WO 2012/110084 A1 | 8/2012 |
| WO | WO 2012/136256 A1 | 10/2012 |
| WO | WO 2012/136269 A1 | 10/2012 |
| WO | WO 2012/163423 A1 | 12/2012 |

* cited by examiner

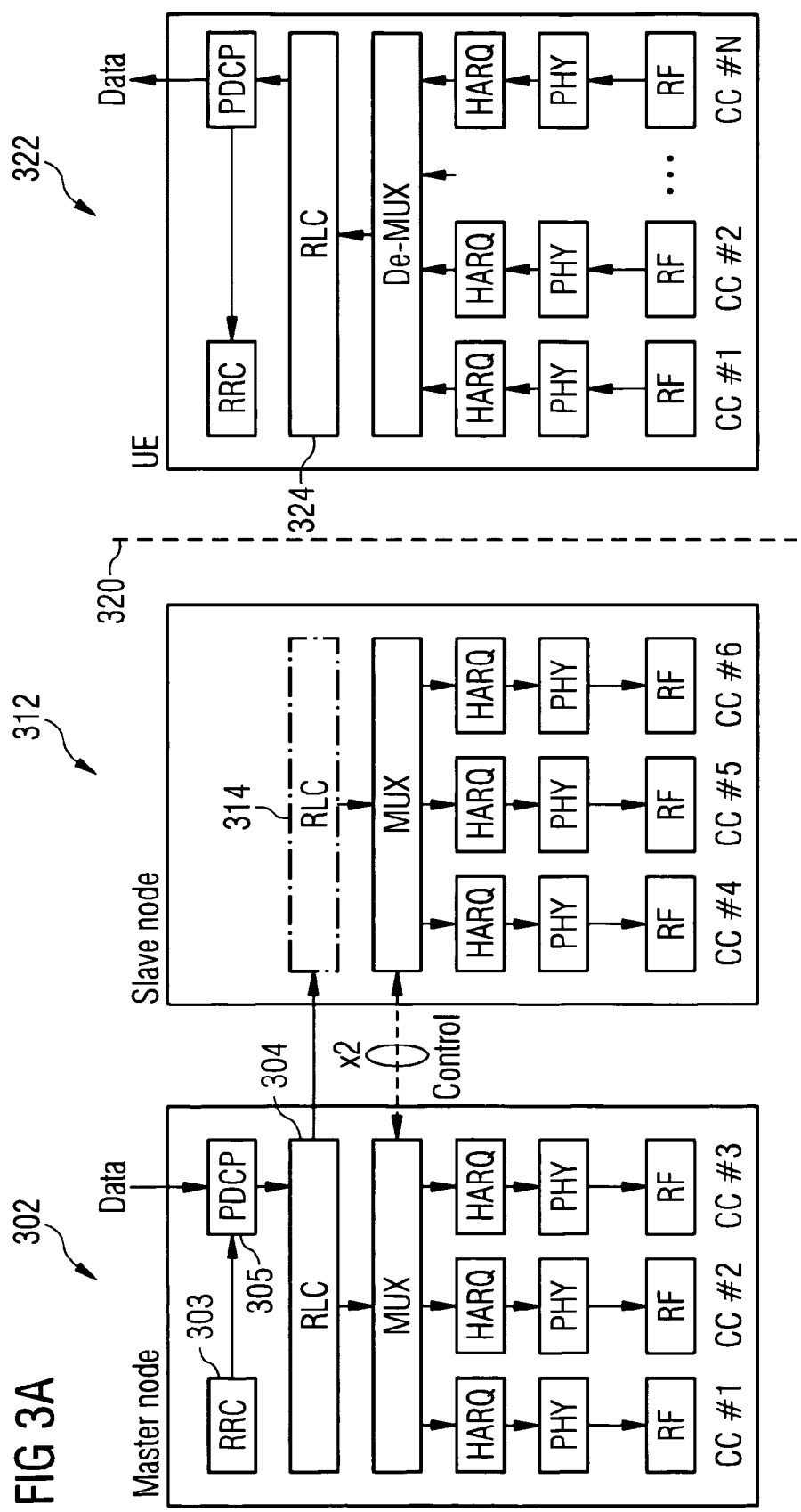

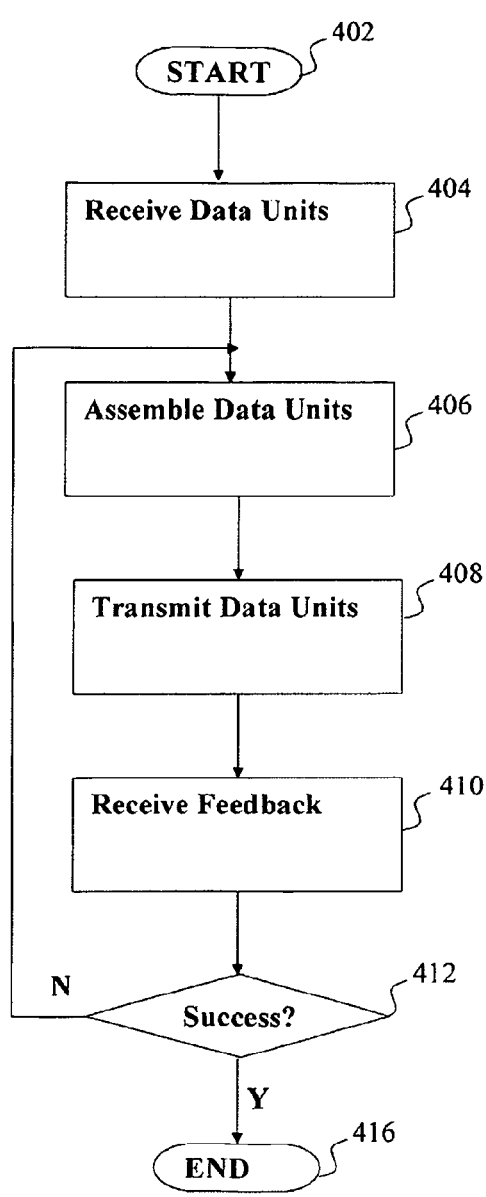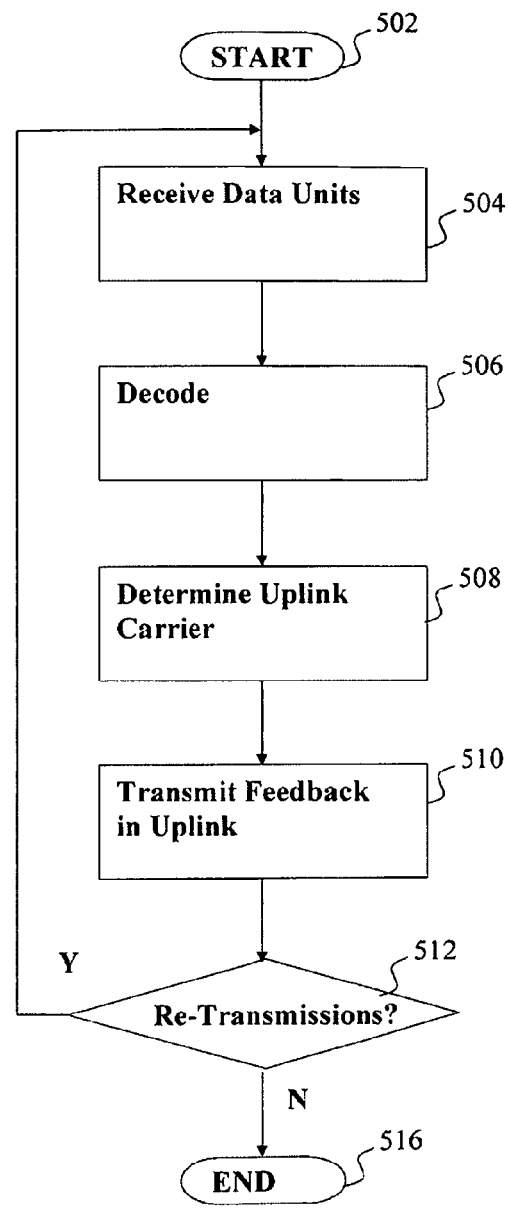
FIG. 4
FIG. 5

PROVIDING A RADIO BEARER ON A PLURALITY OF COMPONENT CARRIERS

FIELD

The present invention relates to providing an air interface to UE, and particularly to providing an air interface to UE on a plurality of component carriers.

BACKGROUND

Long Term Evolution (LTE) carrier aggregation (CA) is part of the LTE-Advanced standard, 3GPP Release 10. Carrier aggregation is a key feature of LTE-Advanced (LTE-A) that enables operators to create larger "virtual" carrier bandwidths for LTE services by combining separate spectrum allocations. The benefits of this aggregation include higher peak data rates and increased average data rates for users.

In inter-site CA data is delivered to UE on carriers of different sites, enhanced NodeBs (eNBs). The dividing of data to different eNBs takes place typically in the eNB controlling the Primary Cell (PCell), referred to herein as a Master enhanced NodeB (MeNB). A part of the data flow to the user equipment (UE) is transmitted via the MeNB using one or more carrier frequencies, while rest of the data flow is forwarded via an X2 interface to an eNB controlling a Secondary Cell (SCell), referred to herein by a slave eNB (SeNB). From the SeNB the data flow may be delivered to the UE using one or more other carrier frequencies.

Data-transport protocols employing ACK/NACKs and providing reliable in-sequence data delivery (e.g. TCP, RLC Acknowledged Mode, etc.) have restricted resources, e.g. numbering space, available for book-keeping of transmitted Protocol Data Units (PDUs). When these resources have been fully assigned to follow up transmitted PDUs, protocol stalling may occur and new data cannot be transmitted to the User Equipment (UE) until some of the book-keeping resources are freed.

The concept of inter-site CA introduces delay to the data by the data being transmitted over the X2 interface between the MeNB and SeNB. This may increase the delay to the PDUs delivered via the SeNB up to 20 ms. Additional delay may be caused by scheduling at the SeNB due to non-ideal flow control.

Due to the delays protocol stalling may be increased which again reduces data rates received by users.

BRIEF DESCRIPTION

According to an aspect of the invention there is provided a method comprising providing a radio bearer to user equipment on a first component carrier by a first network node and on a second component carrier via a second network node connecting to the first network node, and receiving data units of the radio bearer on the first component carrier on the basis of the first network node terminating a protocol bearer of the radio bearer.

According to an aspect of the invention there is provided a method comprising receiving data units of a radio bearer from a first network node providing delivery of the data units of the radio bearer on a first component carrier to user equipment, wherein the received data units are destined to the user equipment via a second network node providing the radio bearer to user equipment on a second component carrier, transmitting the received data units on the second component carrier, and receiving, via the first network node terminating all protocol bearers of the radio bearer, information regarding the reception of the transmitted data units.

According to an aspect of the invention there is provided a method comprising determining a network node that terminates a protocol bearer of a radio bearer provided by a first network node on a first component carrier and on a second component carrier via a second network node connected to the first network node, and transmitting data units of the radio bearer on a component carrier of the network node that terminates the protocol bearer.

According to an aspect of the invention there is provided a method comprising transmitting data units of an air interface protocol on a first component carrier of a first network node and on a second component carrier via a second network node connected to the first network node, receiving data units of the air interface protocol on an uplink component carrier linked to the first component carrier, when the air interface protocol terminates at the first network node, and on an uplink component carrier linked to the second component carrier, when the air interface protocol terminates at the second network node.

According to another aspect of the invention there is provided an apparatus comprising at least one processor, and at least one memory including computer program code, the at least one memory and the computer program code configured to, with the at least one processor, cause the apparatus at least to perform a method according to an aspect.

According to another aspect of the invention there is provided an apparatus comprising means configured to perform a method according to an aspect.

According to another aspect of the invention there is provided a computer program product comprising executable code that when executed, cause execution of functions of a method according to an aspect.

According to another aspect of the invention there is provided a system comprising one or more apparatuses according to an aspect.

According to another aspect of the invention there is provided a system, wherein a radio bearer comprising aggregated carriers is provided by a first apparatus according to an aspect providing a first component carrier of aggregated carriers, and a second apparatus according to an aspect connected to the first apparatus, via which a second component carrier of the aggregated carriers is provided.

Although the various aspects, embodiments and features of the invention are recited independently, it should be appreciated that all combinations of the various aspects, embodiments and features of the invention are possible and within the scope of the present invention as claimed.

Some embodiments may provide a reduced delay of data units of an air interface protocol between user equipment and a protocol entity terminating the data units in the network.

Further advantages will become apparent from the accompanying description.

BRIEF DESCRIPTION OF THE DRAWINGS

In the following the invention will be described in greater detail by means of preferred embodiments with reference to the attached drawings, in which

FIG. 3a illustrates protocol stacks of eNBs and UE, where the eNBs provide CA with distributed RLC entities according to an embodiment;

FIG. 4 illustrates a method performed by a network node employing CA for delivering data to UE;

FIG. 5 illustrates a method performed by UE receiving data on aggregated carriers;

DETAILED DESCRIPTION

Figure 1:
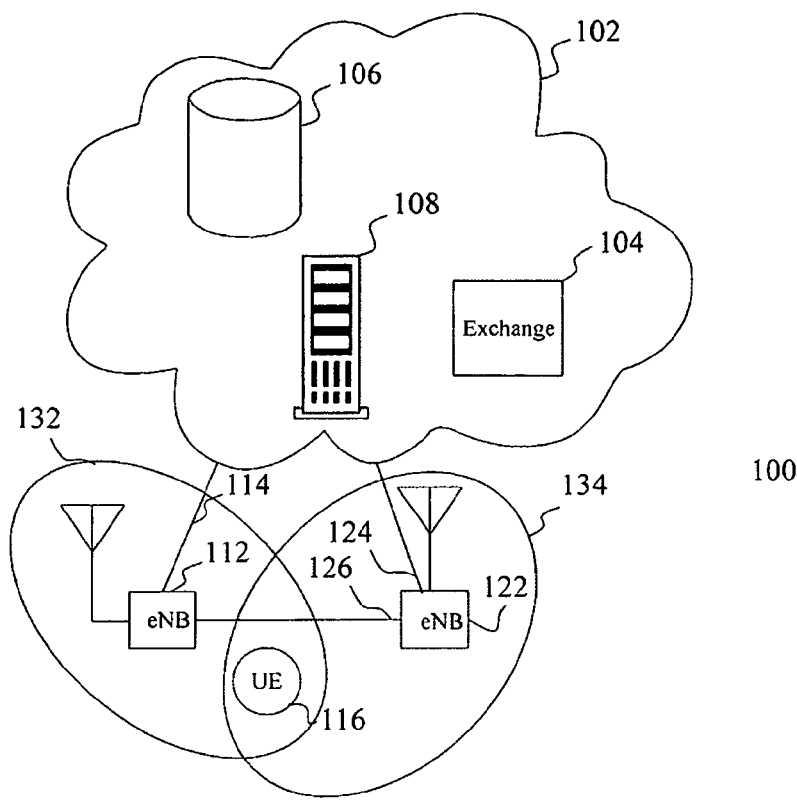
FIG. 1 illustrates a communications network providing inter-site CA according to an embodiment.

Example embodiments of the present invention will now be de-scribed more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Like reference numerals refer to like elements throughout.

The present invention is applicable to any user terminal, server, application server, corresponding component, and/or to any communication system or any combination of different communication systems. The communication system may be a fixed communication system or a wireless communication system or a communication system utilizing both fixed networks and wireless networks. The protocols used the specifications of communication systems, transmitters, user terminals, base stations and access points, especially in wireless communication, develop rapidly. Such development may require extra changes to an embodiment. Therefore, all words and expressions should be interpreted broadly and they are intended to illustrate, not to restrict, the embodiment.

Embodiments of the present invention may be implemented in various devices and systems, where radio signals may be used to carry data between devices such as handheld and infrastructure communications devices. Examples of the devices comprise user equipment (UE), a mobile phone, a base station (BS), a Node-B (NB), an enhanced NB (eNB), a relay station and a server, for example.

User equipment (UE) may refer to any user communication device. A term "user equipment" as used herein may refer to any device having a communication capability, such as a wireless mobile terminal, a Personal Data Assistant (PDA), a smart phone, a personal computer (PC), a laptop computer, a desktop computer, etc. For example, the wireless communication terminal may be a TErrestrial Trunked RAdio (TETRA), an Universal Mobile Telecommunications System (UMTS), an LTE. LTE-A or Global System for Mobile Communications/Enhanced Data Rates for GSM Evolution (GSM/EDGE) smart mobile terminal.

In an embodiment, a Radio Bearer (RB) may provide information transfer service between communicating devices over an air interface. The devices may comprise a network node, e.g. an eNB such as MeNB or SeNB, and UE. The service may be provided by the RB to higher protocol layers, e.g. those above layer 2 of the air interface protocol stack. Data units of the RB may be delivered on one or more logical channels provided by lower layer protocols to the RB. The RB may define a logical link over an air interface between devices communicating on a wireless connection of radio frequencies. The RB may be implemented by one or more protocols, comprising e.g. a PDCP and a RLC protocol, each of which provide a corresponding bearer service to PDUs of each protocol. Accordingly, PDCP protocol PDUs of the RB may be served by a PDCP protocol bearer between the communicating devices. In a similar manner RLC protocol PDUs of the RB may be served by an RLC protocol bearer between the communicating devices.

In an embodiment, devices at both ends of a link defined by a RB may host a peer protocol entity corresponding to a protocol bearer used to implement the RB. The peer protocol bearer entities may define a logical connection between the communicating devices. The protocol bearers may comprise one or more layer 2 protocols e.g. a PDCP and a RLC protocol.

In an embodiment, a RB may comprise a protocol entity or sub-entity responsible for assembling data units of the one or more protocol bearers into one or more logical channels provided by lower layers of a protocol stack. The protocol entity responsible for this may be an RLC protocol entity, for example. Then, the lower layers of the stack may map the data units of the logical channels into transmission resources of an air interface between communicating devices. Accordingly, the lower layers may be responsible for transporting the data units of the logical channels on transmission resources of the air interface. The transmission resources may comprise e.g. a component carrier, a transmission time instant, a sub-carrier, a channellization code, a transport data block, a transport channel, a physical channel and/or any combination of the previous.

A RB may provide transfer of information comprising control plane data and/or user plane data. A RB carrying control plane data may be referred to as Signaling RB (SRB). The control plane data may comprise e.g. one or more Radio Resource Control (RRC) messages. A RB delivering user plane data may be referred to as a Data RB (DRB).

In an embodiment data units of an air interface protocol may refer to data units of a protocol bearer, e.g. RLC protocol bearer. The protocol entity of the protocol bearer may be hosted by a transmitting and/or a receiving device communicating over an air-interface. The hosting may comprise executing operations defined by the protocol to provide services to one or more higher layer protocol entities. Each of the hosted entities may comprise a protocol peer of the air-interface protocol, where data units of the air-interface protocol may be decoded. A protocol peer may terminate the air-interface protocol, when the protocol data units are decoded into service data units of the air-interface protocol to be provided for upper protocol layers. A network node hosting the protocol peer that terminates the air-interface protocol may be referred to as a terminating network node (e.g. MeNB and SeNB in the described embodiments).

In an embodiment a eNB, e.g. MeNB and SeNB may terminate a protocol bearer. The protocol bearer may be terminated by terminating a corresponding protocol of the protocol bearer. Accordingly, RLC protocol bearer may be terminated by terminating the RLC protocol by an RLC protocol entity. The device, e.g. eNB, hosting the RLC protocol entity may thus terminate the RLC protocol bearer. A PDCP protocol bearer may be terminated in a similar manner. In an embodiment, data units of a RB may be terminated by a protocol entity of the RB, e.g. RLC and/or PDCP protocol entities and/or sub-entities. A protocol sub-entity may comprise a part of the functions of a protocol entity. Indeed, in one example the protocol sub-entity may not provide services to upper protocol layers, whereas the protocol entity also interfaces to the upper protocol layers. The sub-entity may interface for example with a protocol entity and/or sub-entity of the same protocol layer. Accordingly, it should be appreciated that a protocol bearer and/or radio bearer may not terminate at a protocol sub-entity or a devices hosting the protocol sub-entity, since the protocol sub-entity does not provide a service to one or more upper protocol layers. Examples of data units of a protocol bearer that may be terminated although the protocol bearer itself is not terminated, comprise an RLC Status, an PDCP Status Report and/or a PDU received by a protocol sub-entity.

In an embodiment, an air interface protocol may refer to a protocol of a protocol bearer of a wireless connection between UE and MeNB. When the wireless connection comprises a radio frequency connection, the air-interface protocol may provide an RB to deliver data between the entities communicating over the air-interface. Examples of the entities comprise UE and an eNB, for example. The air interface protocol may terminate at the UE side of the air-interface and the network node hosting the peer protocol entity at the network side, e.g. the eNB. Accordingly, the UE and the MeNB may comprise corresponding air-interface protocol entities that assemble protocol data units of the air interface protocol at a transmitting protocol entity and decode the received air interface protocol data units at a receiving protocol entity. The air interface protocol may comprise RRC protocol, PDCP protocol and/or RLC protocol, for example.

In an embodiment, a data unit of an air-interface protocol may comprise a data unit of an RLC, a PDCP or an RRC protocol data unit. In one example the air-interface protocol may be unaware of resources used to transmit protocol data units of the air-interface protocol. Accordingly, a protocol entity of the air-interface protocol, may not have information of resources of the lower layer used to transmit the PDUs. The information of the resources may comprise the type of the resource, e.g. a component carrier, a transmission time instant, a sub-carrier, a channellization code, a transport data block and/or any combination of the previous. Additionally, the information of the resources may comprise a size of the resource, e.g. an amount of data the resource may carry. The amount of data may be defined e.g. in bytes.

It should be appreciated that, where the present description refers to data units, also a single data unit may be used. For example, where transmission or reception of several data units have been described, the same description applies also to single data units.

In one example the lower protocol layer may comprise a MAC layer, that may provide a transport data block to one or more PDUs of an upper layer protocol, e.g. RLC. PDCP and/or RRC protocol, that is unaware of the resources used to transmit the PDUs.

It should be appreciated that in an embodiment, any protocol above the MAC, e.g. RLC. RRC and PCDP, may be unaware of the transmission resources used to transmit its PDUs and that a protocol responsible for scheduling RLC or higher layer PDUs into transmission resources may comprise also other protocols than MAC, and include any protocol that is aware of the transmission resources used for PDUs of a higher layer protocol.

In an embodiment information regarding reception of data units of an air-interface protocol may comprise a data unit of the air-interface protocol. The information may comprise feedback information indicating a success and/or a failure of a transmission of a data unit. The feedback information may comprise an acknowledgement message indicating a successful transmission and/or a negative acknowledgement message indicating a failed transmission or any other information that may be received in response to one or more transmitted data units and/or indicating that a transmitted data unit has been received. Accordingly, examples of feedback information may comprise an RLC Status PDU, a PDCP Status Report PDU, for example. In yet another example the feedback information may comprise a response to a transmitted data unit comprising a request, e.g. an RRC PDU comprising a Measurement Report in response to an RRC Measurement Configuration message.

In an embodiment, linked component carriers may comprise an uplink component carrier and a downlink component carrier, whereby data units of an air-interface protocol may be received on the downlink component carrier and data units of the air-interface protocol may be transmitted on the uplink component carrier.

It should be appreciated that linked component carriers may refer to associated component carriers and/or related component carriers. The linked component carries may be provided by different network nodes (MeNB, SeNB) or the same network node.

In the described embodiments a MeNB and a SeNB may be configured with uplink resources for scheduling requests (SR) from UE. In this way the UE may request resources from the MeNB and SeNB to transmit PDUs in uplink. The PDUs may comprise feedback information of received PDUs or any other PDUs of an air-interface protocol.

In an embodiment, specific rules may be introduced in UE that is receiving data using inter-site CA. The rules may be used in the UE to determine on which uplink component carrier and/or subset of uplink component carriers to transmit data units, e.g. Radio Link Control (RLC) PDUs. In this way reception of the RLC PDUs at a preferred network node may be facilitated, for example to minimize any delay. The rules may further comprise rules regarding to which network node the UE should send a Scheduling Request (SR). The determining the network node to send the SR may be based on the kind and/or type of data the UE has to send in uplink direction.

Figure 3B:
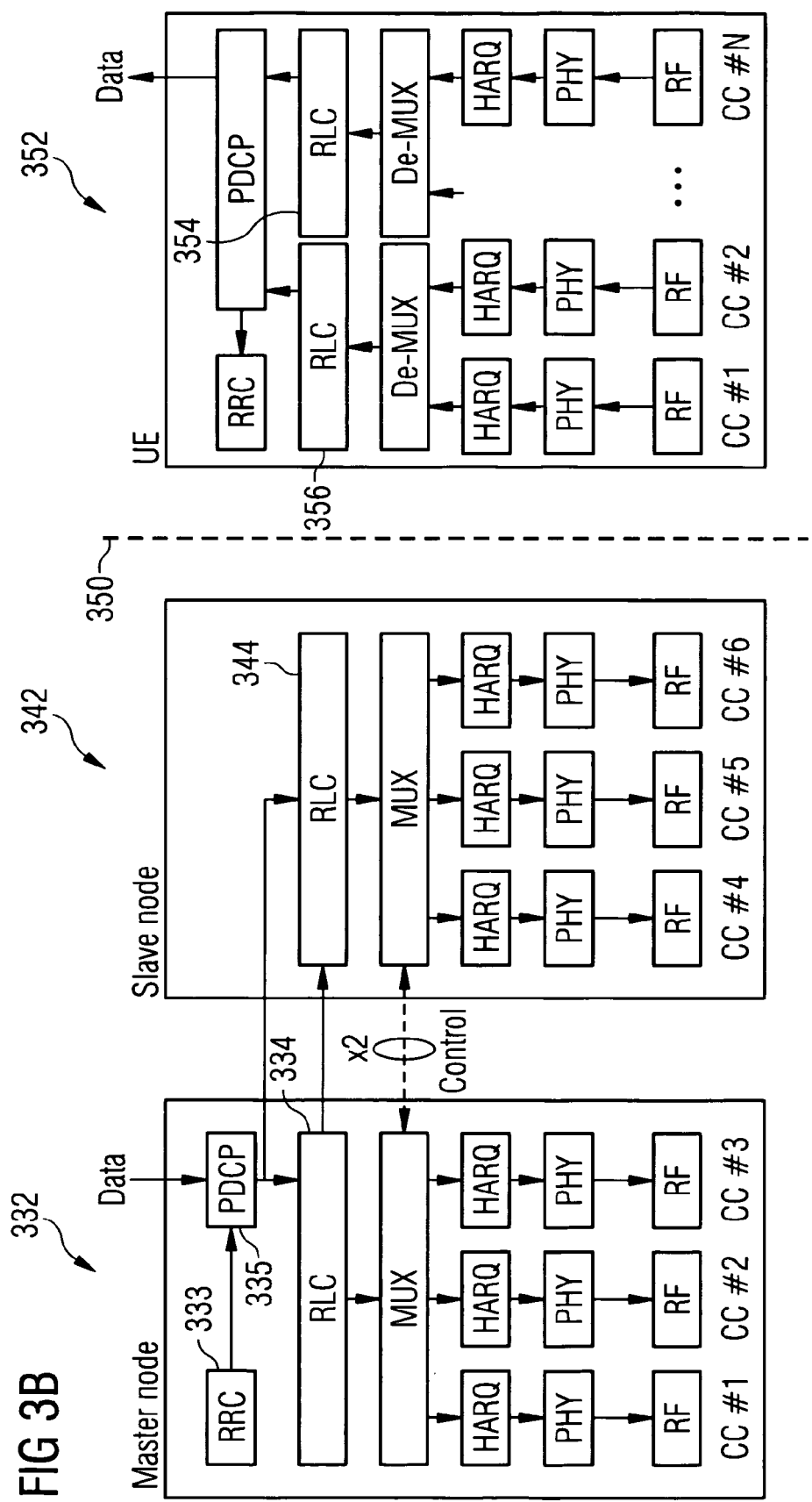
FIG. 3b illustrates protocol stacks of eNBs and UE, where the eNBs provide CA with independent RLC entities according to an embodiment.

In an embodiment. UE may have one or more RLC Status PDUs to be transmitted in uplink to an RLC entity in the network side. Then, the UE may determine an uplink carrier on the basis of the network node that provides the uplink carrier terminating the RLC protocol. In this way, delays experienced by the RLC Status PDUs may be managed with different options to divide data between MeNB and SeNB used in inter-site CA. Examples of the different options to divide/split data are illustrated in FIGS. 3a and 3b.

The described embodiments may provide improvements comprising at least decreasing the number of PDUs forwarded on a connection between eNBs providing data delivery to UE on different component carriers.

FIG. 1 shows simplified system architecture of a communication system according to an embodiment only showing some elements and functional entities, all being logical units whose physical implementation may differ from what is shown. The connections shown in FIG. 1 are logical connections; the actual physical connections may be different. It is apparent to a person skilled in the art that the systems also comprise other functions and structures. It should be appreciated that the functions, structures, elements and the protocols used in or for group communication as such, are irrelevant to the actual invention. Therefore, they need not be discussed in more detail here.

In the network architecture 100 in FIG. 1 is presented an infrastructure network 102 that may be accessed via eNBs 112 and 122. The eNBs 112 and 122 provide radio signal coverage in the respective coverage areas 132 and 134. User Equipment (UE) 116 may reside in the coverage area of one or more of the eNBs.

In an embodiment the UE 116 resides within the coverage areas of both eNBs 112, 122 and may communicate wirelessly with both the eNB 112 and the eNB 122.

In an embodiment the eNBs 112 and 122 may provide radio signal coverage on different Component Carriers (CC).

In an embodiment a component carrier may comprise a frequency band. One example of such a frequency band comprises a frequency band of an operator of a communications system. Such a frequency band may be for example in the frequency range of 800 MHz or 2.6 GHz. The component carrier may comprise a plurality of frequencies that may be scheduled to UE. The frequencies of each frequency band defined by the component carrier may comprise sub-carriers, e.g. orthogonal subcarriers such as OFDM subcarriers. Each of the component carriers may be defined for uplink communications or downlink communications.

In embodiments a combination of downlink and uplink component carrier may be referred to as a cell. The linking between a component carrier in downlink and a component carrier in uplink may be indicated in system information transmitted on a downlink component carrier which may be the same or different component carrier as the downlink component carrier linked with the uplink component carrier.

In an embodiment of the invention, the eNB 112 may connect to the infrastructure network via a connection 114 and eNB 122 may connect to the infrastructure network 102 via a connection 124. The eNB 112 and 122 connect to each other on a connection 126.

The connection between the eNBs may be X2 connection, for example. The connection between the eNB may provide transmission of data and signalling between the eNBs. Thereby, data and/or signalling of the UE within a coverage area of the eNB 112 or eNB 122 may be forwarded on the connection between the eNBs. In this way the data and/signalling to UE may be transmitted via both the eNBs.

The infrastructure network may be a core network comprising one or more exchanges 104, databases 106 and application servers 108 that provide services to the UE connected to the network via ENBs 112 and 122. The connections 114, 124 and 126 may employ different or the same technologies. Examples of the technologies comprise, but are not limited to, Internet Protocol (IP) and E1. Connections between the exchanges, databases and application servers in the infrastructure network may employ the same technologies as connections 114, 124 and 126, or they may be different.

The database 106 may store subscriber data such as subscriber identifier and group identifiers associated with the subscriber. The stored subscriber data may be used to identify the UE connecting to the network.

The application server 108 may comprise service logic for providing one or more services in the network. The application server may also provide storage for application specific data. Accordingly, the application server may host applications that provide the services.

The switch 104 may comprise signalling means and other functional units that enable subscriber lines, telecommunication circuits and/or other functional units to be interconnected as required by individual users. A switch may also include the function of the router. Accordingly, the switch may be configured to route Internet Protocol (IP) packets.

The connections in the embodiments may be wired or wireless. A wireless connection may be implemented with a wireless transceiver operating according to the TETRA, LTE, GSM, WCDMA (Wideband Code Division Multiple Access), Direct Sequence-CDMA (DS-CDMA), OFDM (Orthogonal Frequency Division Multiplexing), WLAN (Wireless Local Area Network), WiMAX (Worldwide Interoperability for Microwave Access) or Bluetooth® standard, or any other suitable standard/non-standard wireless communication means. A wired connection may be implemented for example using Asynchronous Transfer mode (ATM), Ethernet, E1 or T1 lines.

Figure 2:
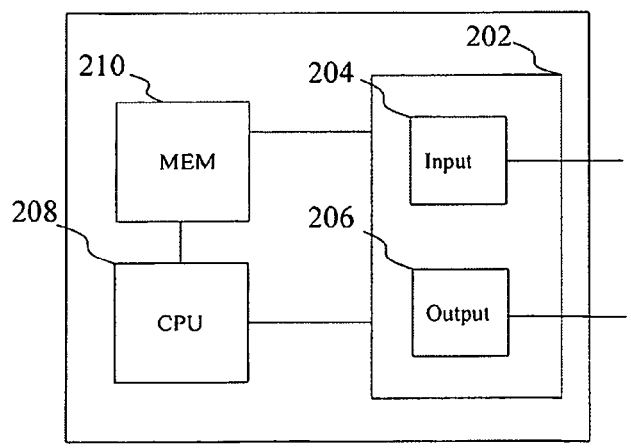
FIG. 2 illustrates an apparatus suitable to implement any of the described embodiments.

FIG. 2 is a block diagram of an apparatus 200 according to an embodiment of the invention. The apparatus may comprise a MeNB, a SeNB or UE described in the embodiments. Although the apparatus has been depicted as one entity, different modules and memory may be implemented in one or more physical or logical entities. The apparatus may be a terminal suitable for operating as a termination point for telecommunication sessions. Examples of the apparatus include but are not limited to UE, a mobile phone, communicator, PDA, application server or a computer.

The apparatus 200 comprises an interfacing unit 202, a central processing unit (CPU) 208, and a memory 210, that are all being electrically interconnected. The interfacing unit comprises an input 204 and an output unit 206 that provide, respectively, the input and output interfaces to the apparatus. The input and output units may be configured or arranged to send and receive data and/or messages according to one or more protocols used in the above-mentioned communication standards. The memory may comprise one or more applications that are executable by the CPU.

The CPU may comprise a set of registers, an arithmetic logic unit, and a control unit. The control unit is controlled by a sequence of program instructions transferred to the CPU from the memory. The control unit may contain a number of microinstructions for basic operations. The implementation of micro-instructions may vary, depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions. The memory may be a volatile or a non-volatile memory, for example EEPROM, ROM, PROM, RAM, DRAM, SRAM, firmware, programmable logic, etc.

An embodiment provides a computer program embodied on a distribution medium, comprising program instructions which, when loaded into an electronic apparatus, cause the CPU to perform according to an embodiment of the present invention.

The computer program may be in source code form, object code form, or in some intermediate form, and it may be stored in some sort of carrier, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital computer or it may be distributed amongst a number of computers.

The apparatus 200 may also be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus 200, necessary processing capacity, production costs, and production volumes, for example.

In an embodiment the input unit may provide circuitry for obtaining data, signalling, signalling messages and/or transmissions to the apparatus. The obtaining may comprise receiving radio frequency signals from an antenna, for example. In another example the obtaining may comprise receiving baseband signals from an RF unit. Accordingly, data, signalling, signalling messages and transmissions in embodiments of the present disclosure may be provided as RF signals or baseband signals.

In an embodiment the output unit may provide circuitry for transmitting data, signalling, signalling messages and/or transmissions from the apparatus. The transmitting may comprise transmitting radio frequency signals from an antenna, for example. In another example the transmitting may comprise transmitting baseband signals to an RF unit. Accordingly, data, signalling, signalling messages and transmissions in embodiments of the present disclosure may be provided as RF signals or baseband signals.

FIG. 3a illustrates protocol stacks of eNBs 302, 312 and UE 322, where the eNBs provide CA with distributed RLC entities according to an embodiment. The eNBs 302 and 312 may be the eNBs 112 and 122 of FIG. 1, for example. In the example of FIG. 3a, the eNB 302 may operate as a MeNB and the eNB 312 may operate as a SeNB. In the following the operation of the MeNB and SeNB with distributed RLC entities and the related UE is explained with reference to FIG. 4 illustrating a method performed by a network node implementing CA for delivering data to UE, and with reference to FIG. 5 illustrating a method performed by the UE receiving data on aggregated carriers.

In FIG. 3a, the MeNB 302 hosts RRC 303, PDCP 305 and RLC 304 protocol entities. Thereby, the corresponding protocol bearers of the protocols may be terminated at the MeNB, when the UE is provided a RB on component carriers of the MeNB and SeNB. Accordingly, in the scenario of FIG. 3a, all the protocol bearers terminate at the MeNB.

In 402 each of the eNBs 302 and 312 have been configured to transmit data to UE on at least one component carrier, where the data to UE may be divided at the eNB 302 to one part that may be transmitted via the eNB 302 and a another part that may be transmitted via the eNB 312.

The configuring may comprise establishing an RRC connection between the UE and the network. At the network side, the RRC connection may be established to the eNB 302 that may serve as a MeNB that provides a serving cell providing the RRC connection to the UE. This Cell may be referred to as a Primary Cell (PCell). The CC in downlink corresponding to the PCell may comprise Downlink Primary Component Carrier (DL PCC).

The configuring may further comprise configuring the eNB 312 to serve as SeNB that provides a Secondary Cell (SCell) to the UE. The SCell may form together with the PCell a set of serving cells. The CC in downlink corresponding to the SCell may comprise a Downlink Secondary Component Carrier (DL PCC).

The UE may be informed about the configured PCell and SCell by RRC messages, e.g. by a RRC connection establishment or RRC connection re-configuration message, including information of the PCell and SCell to the UE.

In 404 the MeNB may receive data to be transmitted to the UE by the MeNB and the SeNB. The data may comprise user plane data and/or control plane data. The control plane data may comprise Non-Access Stratum (NAS) PDUs, for example. In the example of FIG. 3a, the RLC entity 304 of the MeNB 302 may receive Packet Data Convergence Protocol (PDCP) PDUs from the PDCP entity 305. The PDCP PDUs may carry data received at the MeNB to be delivered to the UE and/or RRC PDUs generated by the RRC entity 303.

In 406 the received data to be transmitted to the UE may be assembled into data units of an air interface protocol at the MeNB. The air interface protocol may comprise a protocol used on a wireless connection between the UE and the MeNB. The air interface protocol terminates at the UE and the network node hosting the peer protocol entity at the network side, in this case the MeNB. Accordingly, the UE and the MeNB comprise corresponding air interface protocol entities that assemble protocol data units of the air interface protocol at a transmitting protocol entity and decode the received air interface protocol data units at a receiving protocol entity. The air interface protocol may comprise RRC protocol, PDCP protocol and/or RLC protocol.

In the following, assembling 406 RLC PDUs from received 404 data units at the MeNB 302 will be explained.

The RLC entity of the MeNB 302 may assemble 406 RLC PDUs that may be transmitted 408 to UE over an air interface 320 via lower protocol layers on one or more component carriers CC #1, CC #2 and CC #3 of the MeNB and on one or more of the component carriers CC #4, CC #5 and CC #6 of the SeNB 312.

The RLC entity may assemble 406 the RLC PDUs by adding a RLC header to data received from a higher layer. The assembling may further comprise segmentation or concatenation of an RLC PDU to make it fit into a transport block provided by the lower layer, e.g. MAC layer. In this way RLC PDUs may fit within the total size of RLC PDU(s) indicated by the lower layer at a particular transmission opportunity notified by the lower layer.

In an embodiment, the RLC entity may operate in an acknowledged mode (AM), where an in-sequence delivery of RLC PDUs and an error correction method for facilitating successful delivery of RLC PDUs to peer RLC protocol entity (e.g. UE). The in-sequence delivery may facilitated by a sequence number (SN) assigned by the RLC entity in the RLC header of the RLC PDU. The error correction method may comprise re-transmissions of the unsuccessfully delivered RLC PDUs. The error correction mechanism may comprise e.g. Automatic Repeat reQuest (ARQ) that is an error control method for data transmission that uses acknowledgement messages from the receiver indicating that it has correctly received the data.

The RLC PDUs transmitted 408 via the SeNB may be forwarded from the RLC entity 304 to the SeNB on the X2 interface. Additionally, control information may be exchanged between the MeNB and SeNB. This information may comprise e.g. scheduled throughput information.

At the SeNB, the forwarded RLC PDUs may be assembled 406 into transport blocks of a lower protocol layer, e.g. MAC layer, at the RLC sub-entity 314. If a forwarded RLC layer PDU does not fit into a transport block of a lower layer protocol, the RLC sub-entity may perform re-segmentation or concatenation to facilitate transmitting the RLC PDU on the transport block. In this way the transport block scheduled for transmission on a component carrier of the SeNB may be employed for transmitting the RLC PDU to UE although the size of the eventually transmitted RLC PDU was determined on the basis of the size indicated by lower layers at the SeNB.

Accordingly, in the example of FIG. 3a with distributed RLC entities 304 and 314, the RLC SN may be assigned in the MeNB and the RLC PDUs formed by the RLC sub-entity may directly inherit the SNs assigned at the MeNB.

In 502 the UE may be configured to receive 504 data units of an air interface protocol on a first component carrier provided by a first network node and on a second component carrier provided by a second network node. The method may be performed e.g. by the UE 322.

In the example of FIG. 3a, the UE 322 may be configured 502 to receive 504 data on a plurality of CCs CC #1, CC #2, . . . , CC #N comprising at least one CC of the MeNB and on at least one CC of the SeNB.

In 506 the received protocol data units may be decoded by the UE to obtain the data carried by the protocol. In the example of FIG. 3a, the RLC PDUs may be decoded in the RLC entity 324, thereby obtaining parts of one or more RLC SDUs carried by the RLC PDU. The RLC SDUs may be then provided to higher layers, e.g. RRC and PDCP.

In the decoding in 506, an error correction method employed by the air interface protocol may be used by the UE to determine whether RLC PDUs were successfully received from the peer RLC entity (RLC entity 304). For successfully received RLC PDUs, the RLC entity 324 of the UE may send an acknowledgement message to the peer RLC entity 304. In one example the acknowledgement message may comprise an RLC Status PDU.

In 508, an uplink CC for transmitting information regarding a reception of the first part of the data units and the second part of the data units on an uplink carrier linked to the first carrier may be determined by the UE. The determining may comprise determining a network node of the MeNB and the SeNB that terminates an air-interface protocol of the data units, e.g. RLC PDUs received at the UE. Than an uplink carrier of the network node that terminates the air interface protocol may be selected as the uplink carrier for transmitting information regarding the reception of the received data units, e.g. RLC PDUs. The information regarding a reception of the received data units may comprise an acknowledgement message, e.g. the RLC Status PDU.

It should be appreciated that UE 322 may receive information of one or more uplink CCs linked to downlink CCs of the MeNB and the SeNB from System Information (SI) messages. The System Information messages may comprise, e.g. SI Block 2 (SIB2) message. The SIB2 may be received on the CCs configured at the UE, e.g. one or more CCs of each of the MeNB and the SeNB. The SIB2 from the MeNB may include information about one or more CCs provided in downlink direction and one or more CCs provided in the uplink direction in a specific cell, e.g. PCell.

In one example the uplink CC may be determined 508 on the basis of a component carrier used to receive a SRB. The SRB may comprise e.g. one or more control plane configuration messages e.g. RRC messages, such as RRC establishment and/or RRC connection re-configuration message. When the UE has its control plane connection to the MeNB, the CC of MeNB may be used to transmit RRC messages to the UE. Then the UE may determine the linked uplink CC as the uplink CC of the MeNB. The information of uplink CCs available at the MeNB may be obtained from SIB2 messages, for example.

In another example the uplink CC may be determined 508 on the basis of a control plane message linking a downlink CC with an uplink CC received from a MeNB or a SeNB. The control plane message may comprise a control plane configuration message e.g. RRC establishment and/or RRC reconfiguration message that include information of one or more downlink CCs linked with one or more uplink CCs. In another example the downlink CCs linked with uplink CCs may be identified at cell level.

In another example the control plane message may include information of one or more cells linked to the MeNB. Accordingly, than the UE may determine 508 that protocol data units received in downlink on SCell and/or PCell may be transmitted in uplink on CC of the PCell. In this way RLC Status PDUs to RLC PDUs received from SeNB may be directed to the uplink CC towards the MeNB, and avoid delay to the RLC Status PDUs being delivered to the MeNB via the SeNB and X2 connection. In this way re-transmission of the RLC PDU may be initiated in a shorter time than if RLC Status PDU was sent directly back to the SeNB that transmitted it to the UE, i.e. on the uplink CC linked to the downlink CC or cell, on which the RLC PDU was received.

In 510 the information regarding a reception of the first part of the data units and the second part of the data units may be transmitted from the UE 322 on the determined uplink CC, that may be the uplink CC of the MeNB. The UE may transmit the information on a Physical Uplink Shared Channel (PUSCH) to the MeNB, for example.

Referring now to FIG. 4, in 410, the RLC Status PDU transmitted by the UE in 510 may be received at the network node providing the uplink carrier, in this example at the MeNB.

The received RLC Status PDU may be decoded at the RLC entity to determine 412 whether the RLC PDU transmitted in 408 was successfully received at the peer RLC entity (RLC entity 324). If the RLC PDU was not successfully received the process may proceed to 406 where the re-transmission of the RLC PDU may be performed by assembling the failed RLC PDU into transmission resources provided by lower layers at the MeNB.

In 412, an RLC PDU may be identified in the RLC Status PDU message by the SN assigned to the RLC PDU when the RLC PDU was assembled in 406. In the example of distributed RLC entities of FIG. 3a, the SNs may be assigned by the RLC entity 304. Thereby, the RLC PDU identified in the RLC Status PDU received in 410 may have been transmitted to the UE on the CC of the MeNB or the CC of the SeNB.

Accordingly, it should be appreciated that since the failed RLC PDUs may be identified at the RLC entity of the MeNB, where the RLC PDUs were first assembled, the re-transmissions of any RLC PDU may be performed on the CC of the MeNB. In this way also RLC PDUs first transmitted on the CC of the SeNB may be re-transmitted on the CC of the MeNB. In this way, the delay of the connection between the MeNB and the SeNB may be avoided, and possible further delay that may be involved with segmentation or concatenation process performed at the RLC sub-entity 314 at the SeNB.

When in 412 it is determined on the basis of the RLC Status PDU that the transmitted RLC PDU was successfully received, no re-transmissions of the RLC PDU may be needed and the process may end in 416.

FIG. 3b illustrates protocol stacks of eNBs 332, 342 and UE 352, where the eNBs provide CA with independent RLC entities according to an embodiment. The MeNB 332 may be configured with an RLC entity 334 similar to MeNB 302 in FIG. 3a. As a difference to SeNB of FIG. 3a, the SeNB 342 in FIG. 3b, may be configured with an independent RLC entity 344. The functionality of the RLC entity 344 similar to RLC entity 334 and what is described above with RLC entity 304 of FIG. 3a. Accordingly, as a difference to FIG. 3a and RLC entities 304 and 314 of MeNB and SeNB, in the example of FIG. 3b, both the RLC entities 334 and 344 may assign SNs to RLC PDUs. In the following the operation of the MeNB and SeNB with independent RLC entities and related UE is explained with reference to FIG. 4 illustrating a method performed by a network node employing CA for delivering data to UE over an air-interface 350, and with reference to FIG. 5 illustrating a method performed by the UE receiving data on aggregated carriers.

In FIG. 3b, the MeNB 332 hosts the RRC 333, PDCP 335 and RLC 334 protocol entities. Additionally, the SeNB 342 hosts the RLC protocol entity 344. Thereby, as a difference to the scenario of FIG. 3a, RLC protocol bearers may terminate in the MeNB and SeNB, when the UE is provided a RB on component carriers of the MeNB and SeNB.

In 402 each of the eNBs 332 and 322 have been configured to transmit data to UE 352 on at least one component carrier, where the data to UE 352 may be divided at the eNB 332 to one part that may be transmitted via the eNB 302 and a another part that may be transmitted via the eNB 312. In the example of FIG. 3b, the RLC entity 334 of the MeNB 332 may receive PDCP PDUs from the PDCP entity 335 in a similar way as described above with the example of FIG. 3a and MeNB 302. Accordingly, the PDCP PDUs may include data received at the MeNB 332 to be delivered to the UE 352 and/or RRC PDUs from the RRC entity 333. However, PDCP PDUs from the PDCP entity may be divided between the MeNB and SeNB. Accordingly one or more of the PDCP PDUs from the PDCP entity may be transmitted to the SeNB 342 to be delivered to the UE.

The RLC entity 344 of the SeNB 342 may receive PDCP PDUs from the PDCP entity of the MeNB via an X2 connection between the MeNB and the SeNB. Accordingly, the one part of the PDCP PDUs from the PDCP entity may be provided to the RLC entity of the MeNB and another part may be forwarded to the RLC entity of the SeNB. The operation of the RLC entities 334 and 344, and MeNB 332 and the SeNB 342 may be as described with reference to the example of FIG. 3a and steps 404, 406 and 408, except that no RLC PDUs are forwarded to the SeNB, since dividing of the data may be done already for the PDCP PDUs, as described above.

Accordingly, in the example of FIG. 3b the RLC PDUs may be assembled 406 by each of the independent RLC entities from PDCP PDUs. The assembled RLC PDUs may be transmitted on one or more CCs of each MeNB and SeNB as described with FIG. 3a and step 408 above.

The operation of UE 352 of FIG. 3b will now be explained with reference to FIG. 5 illustrating a method performed by UE receiving data on aggregated carriers from different network nodes. The network nodes may comprise a MeNB 332 and a SeNB 342.

In 502 the UE may be configured to receive 504 data units of an air interface protocol on a first carrier provided by a first network node and on a second carrier provided by a second network node. The method may be performed e.g. by the UE 352.

In the example of FIG. 3b, the UE 352 may be configured to receive data on a plurality of CCs CC #1, CC #2, . . . , CC # comprising at least one CC of the MeNB and on at least one CC of the SeNB.

In an embodiment, the UE may comprise dedicated RLC entities 354, 356 corresponding to each cell of a set of serving cells configured at the UE. In one example, there may be dedicated RLC entities to each one of the MeNB and the SeNB, which provide a PCell and a SCell respectively. In this way RLC PDUs from independent RLC entities of the MeNB and the SeNB may be provided to corresponding peer entities to be processed.

In 506, the received protocol data units may be decoded to obtain the data carried by the protocol. In the example of FIG. 3b, the received RLC PDUs may be decoded in the RLC entity 354 or 356 on the basis of the CC used to receive the RLC PDU. Accordingly, each of the RLC entities 354 and 356 may be associated with one or more CC and processed RLC PDUs received from the associated CCs.

In one example there may be an RLC entity corresponding to each serving cell configured at the UE. In the example of FIG. 3b, there are two serving cells, a Pcell of MeNB and a SCell of SeNB. Thereby, the RLC entities 354 and 356 may be associated to the different cells, so that each of the cells may have an independent RLC entity to process RLC PDUs received in that cell.

In 506 the decoding in each of the RLC entity 354, 356 provides parts of the one or more RLS SDUs carried by the received RLC PDU on the associated CC.

The decoding in 506 may comprise determining whether all RLC PDUs thus far have been received. The determining may be provided by an error correction method similar to step 506 above with the example of FIG. 3a and UE 322.

Accordingly, when an RLC Status PDU may be assembled 406 at any of the RLC entities 356 and 354, the uplink carrier of the network node terminating the RLC protocol may be determined similar to step 508 explained above with the example of FIG. 3a. The determining may be performed for each RLC entity in the UE. In this way the shortest path for RLC Status PDU to RLC peer entity may be determined.

In an embodiment, the uplink carrier for RLC Status PDUs from the UE may be determined in 508 on the basis of the association of each of the RLC entities of the UE to one or more CCs. The CCs may be downlink CCs, whereby the uplink CC for the RLC Status PDU may be determined on the basis of information of one or more linked uplink CCs and downlink CCs and/or one or more linked uplink CC and cells. This information may be obtained at the UE from SI messages as described above.

Accordingly, in 508 the CC on which the RLC PDU was received may be used to determine an uplink carrier on the basis of information of one or more uplink carries linked to the CC. Then the RLC Status PDU may be transmitted using the determined uplink CC to ensure fast delivery of the RLC Status PDU to the network node that terminates the RLC protocol. In this way, the delays of delivering the RLC Status PDU may be kept low.

In another example the uplink CC may be determined 508 on the basis of a control plane message linking a downlink CC with an uplink CC, as described above.

After determining the uplink carrier to be used for RLC Status PDUs from independent RLC entities, the RLC Status PDUs may be transmitted 510 from the UE 352 on the determined uplink carrier.

Similar to above with the example of distributed RLC entities of FIG. 3a, an RLC Status PDU may be transmitted on the PUSCH to the network node hosting the peer RLC entity to the RLC Status PDU being delivered.

When the UE supports dual-carrier uplink, the UE may implement a PUSCH transmission to both the MeNB and the SeNB in a straightforward manner. In this way RLC PDUs may be provided to both peer entities at the MeNB and SeNB at the same time, which facilitates keeping delays low in transmitting the RLC Status PDU to the RLC peer entities.

When the UE supports a single-carrier uplink, the UE may separately transmit an RLC PDU to each of the master and slave nodes based on time division multiplexing. Since the UL sub-frame configuration may be known at both master and slave nodes as a result of a pre-configuration out of scope of the present invention, this in practice allows PUSCH allocation in specific sub-frames from the corresponding node.

When the decoding in 506 indicated one or more failures of RLC PDUs, the process may proceed from 512 to 504 to receive re-transmissions of the failed RLC PDUs. Otherwise the RLC PDU was successfully received in 504 and the process may end in 516.

The RLC Status PDU from the UE 352 may be received 410 at each of the MeNB 332 and SeNB 342 similar to already described above with step 410 and the FIG. 3a. However, in the example of FIG. 3b, since the MeNB and SeNB implement independent RLC entities, a re-transmission following unsuccessful transmission of an RLC PDU determined in 412, may be performed on the same CC or at least on the CC of the same eNB that transmitted the first RLC PDU. Indeed, it should be appreciated that in one example a different CC than the first may be used at the eNB (MeNB or SeNB) if more than one CC may be available at the eNB in the downlink and configured at the UE. Accordingly, the re-transmission may be determined in the example of independent RLC entities in FIG. 3b similar to described with MeNB 302 and step 412 in each of the MeNB and SeNB implementing independent RLC entities.

When in 412 it may be determined on the basis of the RLC Status PDU that the transmitted RLC PDU was successfully received, no re-transmissions of the RLC PDU may be needed and the process may end in 416.

In an embodiment there is provided a method illustrated in FIG. 4. The method may be performed by a network node delivering data to UE on a direct connection over an air interface on a component carrier and via another network node providing the air interface on another component carrier to the UE. The network node may be e.g. MeNB such as MeNB 302 of FIG. 3a. The method starts in 402, where a component carrier at each of a first network node and a second network node may be configured for delivering data to UE. The configuring may comprise configuring a serving cell at each network node for the UE. The configuration may be communicated to the UE by control plane signalling, e.g. by one or more an RRC messages comprising the configuration of the serving cells.

Accordingly, in the example with MeNB, the MeNB may be configured with a PCell and data may be delivered to the UE via a SeNB configured to provide SCell to the UE.

In 404 data to be delivered may be received at the first network node. The data may be received from a network backbone connecting the first network node to a network infrastructure, for example.

In 406 data units of an air interface protocol may be assembled at the first network node. The assembling may comprise arranging the received data into one or more scheduled resources of the first network node. Depending on the air interface protocol a header may be added to the received data and the received data may be coded.

In an embodiment, in 406 a sequence number to each data unit may be allocated from a set of available sequence numbers of a sequence number space hosted by the first network node. The allocation of sequence numbers may provide in-sequence delivery of the assembled data units. The allocation may comprise reserving memory resources for bookkeeping of the sequence numbers and storing the protocol data units for re-transmitting them in case of unsuccessful transmissions to user equipment.

The scheduled resource may comprise the first component carrier, a transmission time instant, a sub-carrier of the component carrier, a channelization code, a transport data block and/or any combination of the previous. In one example the lower protocol layers may provide information of the scheduled resource. The information may comprise a size of the scheduled resources, for example.

The first part of the assembled data units may be transmitted 408 on the first component carrier to user equipment. The transmitting may utilize the scheduled resources, where the data units may have been assembled in 406.

The second part of the data units may be transmitted 408 via a second network node on a second component carrier. The first and second network node may be connected, whereby the data units may be forwarded on the connection to the second network node to be transmitted to user equipment. Information may be received 410 regarding a reception of the first part of the data units and the second part of the data units on an uplink component carrier linked to the first component carrier.

Accordingly, in an embodiment, in 410, the information regarding reception may be received via the first network node that terminates all protocol bearers of the radio bearer.

The information received in 410 may comprise at least one from a group comprising a Radio Link Control protocol status protocol data unit, a PDCP status protocol data unit and an acknowledgement message. The received information may be used to determine whether any of the data units were delivered unsuccessfully 412, and to re-transmit 406 the unsuccessfully delivered data units on the first component carrier. The re-transmission may include assembling of the re-transmitted protocol data units into the scheduled resources.

When the data units are successfully 412 transmitted, the process ends 416. Following the successful transmission of data units, any resources reserved for re-transmitting them may be released. This may comprise updating a set of available sequence numbers so that the sequence numbers reserved by successfully transmitted/re-transmitted protocol data units may be released and made available to following protocol data units to be transmitted to user equipment.

In an embodiment, the method of FIG. 4 may be performed by a network node receiving data units to be transmitted to UE on a direct connection over an air interface on a component carrier, from another network node transmitting to UE over the air interface on another component carrier. The network node may be e.g. SeNB such as SeNB described in the above embodiments. The method starts in

402, where a component carrier at each of a first network node and a second network node may be configured for delivering data to UE. The configuring may comprise configuring a serving cell at each network node for the UE. The configuration may be communicated to the UE by control plane signalling, e.g. by one or more an RRC messages comprising the configuration of the serving cells.

Accordingly, in the example with SeNB, the SeNB may be configured with a SCell and the SeNB may connect to a MeNB that may be configured to provide a PCell to the UE, for receiving data units to be delivered to the UE The method may comprise receiving 404 data units from a first network node providing a first component carrier for delivering data units to user equipment, wherein the received data units are destined to user equipment via a second network node providing a second component carrier and connected to the first network node.

The received user plane data may be assembled 406 into data units of an air interface protocol. The assembling may comprise arranging the received data into one or more scheduled resources of the second network node. Depending on the air interface protocol a header may be added to the received data and the received data may be coded. Information of the protocol data units and/or the protocol data units may be stored to facilitate re-transmissions to user equipment. The re-transmissions may comprise e.g. lower protocol layer re-transmission, e.g. at MAC layer, when a Local Negative Acknowledgement (NACK) is received from the MAC layer.

The assembled data units may be transmitted 408 on a second component carrier to user equipment. The transmitting may utilize the scheduled resources, where the data units may have been assembled in 406.

In 410, information regarding the reception of the transmitted data units may be received via the first network node. Then, on the basis of the received information it may be determined 412 whether any of the data units were delivered unsuccessfully. In case of unsuccessful transmission, the data unit may be re-transmitted in 406 on the second component carrier.

When data units are successfully transmitted 412, any resources reserved for the transmitted PDUs, e.g. memory storing the PDUs for re-transmitting them, may be released and memory resources may be made available for transmitting new data units by the air-interface protocol.

In an embodiment, feedback from the UE regarding data units of an air-interface protocol transmitted from SeNB may be received 410 to the MeNB, for example in the example of distributed RLCs illustrated in FIG. 3*a*. Than air-interface protocol peer entity at the MeNB may identify that the feedback may be related to data units that were not transmitted on the resources of lower protocol layers at the MeNB. In another example the MeNB may identify that the feedback may relate to data units transmitted to the SeNB to be delivered to the UE. Then the MeNB may transmit the feedback to the SeNB to provide information to the corresponding air-interface protocol entity at the SeNB, e.g. RLC sub-entity. In this way, delivery information of the data units may be provided to the RLC sub-entity, and any memory resources reserved for bookkeeping of the transmitted RLC PDUs via the SeNB may be freed.

In an embodiment there is provided a method illustrated in FIG. 5. The method may be executed by UE described in any of the above embodiments. The method starts in 502, where the UE may be configured with at least two component carriers on an air interface for receiving data from different network nodes. The configuration may comprise receiving one or more control plane messages including information of the component carriers. The control plane messages may include RRC messages e.g. an RRC establishment and/or an RRC connection re-configuration message.

In 504 data units of an air interface protocol may be received on a first component carrier provided by a first network node and on a second component carrier provided by a second network node.

In 506 the received data units may be decoded. In an embodiment, the decoding may be included in the step 504, and comprise any processing of a transmission received on a component carrier, so as to obtain a data unit of an air-interface protocol. Accordingly, in one example no decoding may be needed after step 504.

In 508 the network node of the first and the second network nodes terminating the air-interface protocol of the data units, may be determined. In one example, the node terminating the air-interface protocol may comprise the network node providing the PCell, the network node hosting a control plane connection (e.g. RRC connection) of the UE and/or the network node indicated by a control plane configuration message.

In one example, the determining 508 may comprise receiving a control plane configuration message, said message indicating at least one uplink component carrier of the node that terminates the air-interface protocol. Referring to the example of FIG. 3*a*, the uplink component carrier may comprise the uplink component carrier of the MeNB 302, since with the distributed RLC entities, the RLC PDUs terminate at the RLC entity 304 that is responsible of assigning of the SNs.

In the example of FIG. 3*b*, the determining 508 may comprise receiving a control plane configuration message, said message indicating at least one uplink component carrier of the node that terminates the air-interface protocol, linked to the first and/or the second component carrier. Accordingly, the uplink component carrier linked to the component carrier of the MeNB may an uplink component carrier of the MeNB, and the uplink component carrier linked to the component carrier of the SeNB may an uplink component carrier of the SeNB. Accordingly, it should be appreciated that the message may comprise an uplink component carrier for each downlink component carrier, or separate messages may be received for linking each of the downlink component carriers, where data units are received in 504. In this way, linking of uplink carriers to component carriers may be provided both, where distributed RLC entities or independent protocol entities were used to deliver data to UE.

In another example, the determining 508 may comprise determining that the network node hosting a control plane connection of the UE and/or providing a PCell terminates the air-interface protocol. The network node hosting the PCell may be determined by the configuration of the component carriers at the UE. The network node hosting the control plane connection may be determined by the configuration of the control plane connection at the UE and/or by the network node, where one or more control plane messages may be received from.

In 510 data units of the air interface protocol on an uplink component carrier linked to the network node terminating the air-interface protocol may be transmitted. The network node may comprise the network node determined in 508.

In one example, the uplink carrier linked to the determined network node may be determined from the uplink carrier indicated in one or more received control plane configuration messages, as explained with step 508.

In another example, the uplink carrier linked to the determined network node may be determined on the basis of received signalling. The signalling may comprise messages defining an air-interface of the UE. The messages may comprise e.g. one or more control plane messages. The control plane messages may comprise SI messages and/or SIB2 messages. Accordingly, the received signalling may indicate an uplink component carrier linked to a specific downlink component carrier of the determined network node, e.g. an uplink component carrier of MeNB or SeNB.

The transmitted 510 data units may comprise data units of the air interface protocol. In one example, the data units may comprise information regarding a reception of the received data units on an uplink component carrier linked to the determined network node. If no re-transmissions of the received 504 data units are to be received, the method ends in 516. If there are any re-transmissions of the received 504 data units, the process proceeds to 504 to receive the re-transmitted data units.

When the information regarding reception of the received data units may be delivered to the network node that terminates the air interface protocol of the data units, delays may be kept smaller in delivery of the data units between peer protocol entities over the air-interface than if the data units were not sent directly to the terminating network node of the air-interface protocol. Furthermore, delays involved in starting any re-transmissions may be reduced. Consequently, improved data rates may be provided to the UE.

In an embodiment user plane data and control plane connection may be configured 502 on different component carriers to the UE. The control plane connection may be configured at the MeNB on a component carrier of the MeNB and the user plane data may be delivered to the UE via SeNB on a component carrier of the SeNB. When the control plane connection is configured at the MeNB, on the component carrier of the MeNB, and user plane data may be received on the component carrier of the SeNB, the UE may determine 508 that the MeNB terminates data units of the air interface protocol. Thus data units of the air-interface protocol should be transmitted 510 on an uplink carrier of the MeNB that terminates the air-interface protocol. In this way any user plane data may be transmitted in uplink to the correct network node so that delays which may occur if a connection between MeNB and SeNB would need to be used for the uplink transmissions may be kept low.

Figure 6:
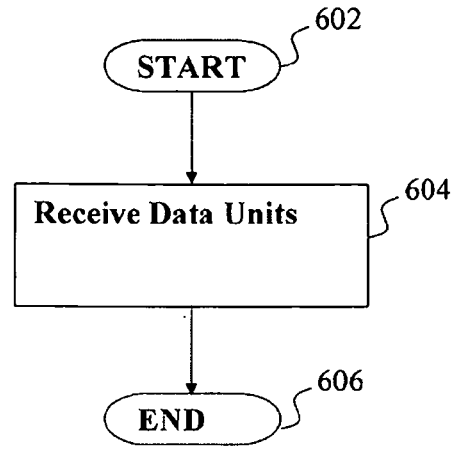
FIG. 6 illustrates a method performed by a network node providing a RB to UE, according to an embodiment.

In an embodiment there is provided a method illustrated in FIG. 6. The method may be performed by a network node delivering data to and/or from UE on a direct connection over an air interface on a component carrier and via another network node providing the air interface on another component carrier to the UE. The network node may be e.g. a MeNB such as a MeNB 302 of FIG. 3a.

The method starts in 602, where a radio bearer to user equipment may be provided on a first component carrier by a first network, e.g. the MeNB node, and on a second component carrier via a second network node, e.g. the SeNB, connecting to the first network node. The component carrier at each of the first network node and a second network node may be configured for delivering data over the air interface. The configuring may comprise configuring a serving cell at each of the MeNB and SeNB for the UE. The configuration may be communicated to the UE by control plane signalling, e.g. by one or more an RRC messages comprising the configuration of the serving cells.

In an embodiment, the component carriers provided by the MeNB and SeNB comprise uplink component carriers. Additionally, one or more downlink component carriers may be configured to the UE, e.g. at the MeNB and/or SeNB.

In one example, in 602 the UE may be provided a plurality of serving cells, e.g. PCell land SCell. Than each of the serving cells may provide delivery of data to the UE in downlink and/or uplink.

In an embodiment, in 602, an RRC connection of the UE may be established to a network node providing a PCell to the UE, e.g. MeNB. Then, System information messages transmitted by the MeNB in the PCell may provide the UE information about an uplink CC linked to the MeNB.

In an embodiment, a control plane configuration message may be transmitted in 602 by the MeNB on the PCell and/or via the SeNB on the SCell to provide the UE information about an uplink CC linked to a downlink CC: In this way the UE may receive information about which uplink CC it should use for data units of the RB to be transmitted in uplink. The control plane configuration message may comprise e.g. an RRC message, such as RRC establishment and/or RRC connection re-configuration message. Using the control plane configuration message, the UE may be provided explicit information of an uplink CC to be used for each cell, e.g. PCell and/or SCell.

In one example, when the distributed RLCs scenario of FIG. 3a is used in the MeNB and SeNB, the control plane configuration message may comprise an indication that an uplink CC of the MeNB is linked to the one or more downlink CCs of the SeNB. In this way, the UE may be provided information that for uplink data units of the RB, the uplink CC of the MeNB should be used. In the distributed RLCs scenario the data units may then be received directly from the UE to the MeNB that terminates the RLC protocol bearer, and the delay of the connection between the MeNB and SeNB for the uplink data units may be avoided.

In the scenario of FIG. 3b, where independent RLCs are used in the MeNB and SeNB, information regarding reception, i.e. feedback information, of one or more data units on each independent RLC protocol bearer may be received by corresponding RLC protocol bearers. Thereby, the feedback information may be received for each RLC protocol bearer directly from the UE without introducing the delay of the X2 connection to the feedback information. Then, data units of the RB that are not feedback information, may be transmitted on the uplink CC indicated in the control plane configuration message, e.g. to the MeNB.

In 604, data units of the radio bearer may be received on the second component carrier via the second network node on the basis of the second network node terminating the data units of a protocol bearer of the radio bearer.

In an embodiment, data units of the radio bearer may be received 604 on the first component carrier on the basis of the first network node terminating all protocol bearers of the radio bearer.

In an embodiment, data units of the radio bearer may be received 604 on the first component carrier on the basis of the first network node terminating a protocol bearer of the radio bearer.

Thereby in 604, when at least one protocol bearer is terminated by another network node, e.g. SeNB, than MeNB, the data units may be received by that node. In this way the PDUs may reach the terminating network node without experiencing a delay due to forwarding the PDUs between the MeNB and SeNB.

The method may end in 606, when the data units are terminated at a protocol entity hosted by the MeNB or SeNB.

Figure 7:
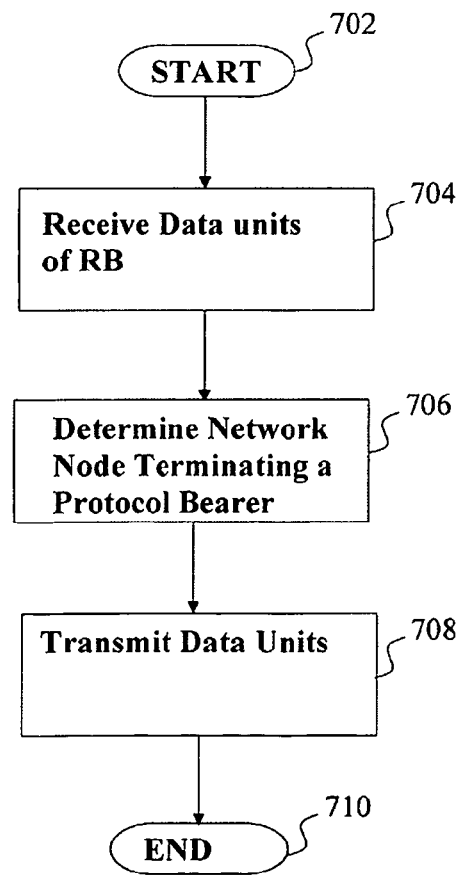
FIG. 7 illustrates a method performed by UE, when provided a RB by two different network nodes, according to an embodiment.

In an embodiment there is provided a method illustrated in FIG. 7. The method may be executed by UE described in any of the above embodiments. The method starts in 702, where the UE may be configured with a radio bearer on a first component carrier by a first network node, e.g. the MeNB, and on a second component carrier via a second network node, e.g. the SeNB, connecting to the first network node. Data may be delivered over an air interface between the network, e.g MeNB and/or SeNB, and the UE on the component carriers configured at the MeNB and SeNB. The configuring may comprise configuring a serving cell at each of the MeNB and SeNB for the UE. The configuration may be communicated to the UE by control plane messages, e.g. by one or more an RRC messages comprising a configuration of the serving cells. The configuration of the serving cells may comprise information of the component carriers to be used by the UE in each cell, for example. The control plane messages may include RRC messages e.g. an RRC establishment and/or an RRC connection re-configuration message.

Accordingly, the RB may comprise at least two component carriers of different network nodes, e.g. the MeNB and SeNB. The component carriers may comprise uplink component carriers. Additionally, the RB may comprise one or more downlink component carriers.

In 704, data units of the RB may be received. The data units may be received on a downlink component carrier configured to the UE. The downlink CC may comprise e.g. a CC of a PCell and/or of SCell. The RB may comprise an SRB and/or DRB.

In an embodiment, when the data units are from a SRB they may be delivered 704 on a specific component carrier to the UE, e.g. on the component carrier of the MeNB. In this way delay of data on the SRB may be kept lower than if SRB would be delivered via the SeNB.

In another embodiment data units of an SRB may be received 704 via SeNB. This may be beneficial if the SeNB provides better radio channel conditions than the MeNB, for example.

In an embodiment, when data units of SRB are delivered on a dedicated component carrier, e.g. that of MeNB or SeNB, a DRB may be provided on another component carrier, e.g. via a different eNB. Such an arrangement may provide capacity sharing between component carriers.

In 706, a network node that terminates a protocol bearer of a radio bearer may be determined. The network node may comprise a network node that terminates data units of the protocol bearer. The RB may be provided by the MeNB network node on a first component carrier and on a second component carrier via a SeNB connected to the MeNB. Accordingly, the terminating network node may be determined in the uplink direction. The protocol bearer may comprise an RLC and/or a PDCP protocol bearer.

In 706, it may be determined, whether all the protocol bearers of the RB terminate at the MeNB. This may be the case for example in the scenario of FIG. 3a, where all the protocol entities of the RB are hosted by the MeNB.

In an embodiment the determining 706 may comprise determining an uplink CC to be used on the basis of a network node, the MeNB or SeNB, where the data units of a SRB are received from in 704. The CC used for SRB in downlink may be linked to an uplink CC at the UE on the basis of information received in a System Information message comprising information of linked uplink and downlink CCs, as explained in the above described examples/embodiments, for example. The System Information message may be received from the eNB, e.g. MeNB, that hosts the control plane connection, i.e. RRC connection, of the UE.

For example, the System Information may comprise information of an uplink CC and a downlink CC of a specific cell, e.g. PCell or SCell. Then, the downlink CC used for the SRB may be used to determine 706 that an uplink CC of the same cell should be used for transmitting 708 uplink of data units of the RB. In this way the network node terminating a protocol bearer may be determined as the network node providing the PCell, for example. This applies for example in the scenario of the distributed RLCs illustrated in FIG. 3a, where all the protocol bearers RLC protocol bearer and PDCP protocol bearer terminate at the MeNB.

By determining 706 the uplink CC on the basis of the SRB as above, control plane data units, e.g. RRC PDUs, may be directly sent 708 from the UE to the network node that terminates them. This is illustrated by both the scenarios of FIG. 3a and FIG. 3b, where the RRC protocol entity is at the MeNB.

In an embodiment, the MeNB delivering the data units of the SRB may be used by the UE to determine 708 that the MeNB terminates both the SRB and DRB. Accordingly, the uplink CC of the MeNB should be used for control plane data units and user plane data units to avoid delay of forwarding data units between MeNB and SeNB, to reach the network node terminating the protocol bearer. This may be used for example in the scenario of distributed RLCs of FIG. 3a.

In an embodiment, an uplink CC for data units of the RB may be determined 706 on the basis of the PCell configured 702 at the UE. Accordingly, when the UE is configured with a plurality of serving cells e.g. PCell and SCell, the uplink CC for the data units of the RB may be determined 704 as the uplink CC of the PCell. In this way at least in the distributed RLCs scenario of FIG. 3a, the data units of the RB from the UE shall avoid the delay of the connection between MeNB and SeNB, since the data units may be transmitted from the UE to the MeNB, where all the protocol bearers may be terminated.

In an embodiment in 704, data units of the SRB comprising a control plane configuration message may be received, said message indicating at least one uplink component carrier of the network node terminating the protocol bearer and linked to the second component carrier, and transmitting 708 the data units on the indicated uplink component carrier. The control plane configuration message may comprise e.g. RRC messages, such as RRC establishment and/or RRC connection re-configuration message. In this way, UE may be defined an uplink carrier specifically, so that different implementations supporting aggregated carriers may be employed, e.g. the distributed RLCs scenario of FIG. 3a and the independent RLCs scenario of FIG. 3b.

Accordingly, for example in the distributed RLCs scenario of FIG. 3a, the control plane configuration message received in 704 may comprise an indication of an uplink CC linked to SeNB. The linking may comprise e.g. a linking to a downlink CC of the SeNB. Then, based on the message, the UE may determine 706 that any data units of a protocol bearer of the RB should use the indicated uplink CC for uplink transmissions to the SeNB. The uplink CC may comprise an uplink CC of the SCell, for example. Than in 706 the uplink CC for data units of the protocol bearer may be determined on the basis of the information of the uplink CC received in the control plane configuration message.

It should be appreciated that in a similar manner as in the above example with SeNB, a control plane configuration message may be received in 704 indicating that any data units of a protocol bearer of the RB should use an uplink CC linked to the MeNB.

The control plane configuration message explained above may be further used by the UE to determine 706 an uplink CC to be used for data units of the protocol bearer that are associated with data units of the protocol bearer received from the SeNB or MeNB linked to the indicated uplink CC. Such data units may comprise e.g. feedback information regarding data units of a protocol bearer, e.g. RLC Status PDUs regarding received RLC PDUs.

In 708, data units of the radio bearer on an uplink component carrier linked to the network node terminating the protocol bearer may be transmitted. The uplink channel may comprise a dedicated physical channel, with dedicated resources allocated to the UE, or a shared physical channel (e.g. PUSCH), where more than one UE may transmit information and there are no fixed resources for the UE. Accordingly, to have uplink resources for the data units, the UE may transmit a Scheduling Request to the MeNB to have resources allocated on the uplink CC.

The PUSCH may be provided by both a MeNB and SeNB. The UE may support dual-carrier uplink transmission, where the UE may transmit on two different CCs, e.g. to MeNB and SeNB, at the same time. However, when the UE supports only single-carrier uplink, transmissions to MeNB and SeNB may be provided by time division multiplexing the transmissions to each of the MeNB and SeNB at the UE. Since the UL subframe configuration may be known at both master and slave nodes, this may allow allocation of resources to UE on the PUSCH in specific subframes from the corresponding node.

In an embodiment, information regarding a reception of the data units, e.g. feedback information, of a protocol bearer from the first network node, e.g. MeNB, and the second network node, e.g. SeNB, may be transmitted 708 on an uplink CC linked to the network node, where the received data units were received from.

In an embodiment, where information regarding a reception of the data units, e.g. feedback information, of a protocol bearer from the first network node, e.g. MeNB, and the second network node, e.g. SeNB, may be transmitted 708 on an uplink CC of the network node hosting a protocol entity that originated the data units. Other data units of a radio bearer, e.g. data units of a protocol bearer of the RB, may be transmitted on the basis of another criterion. The used criterion may be independent from the criterion used to determine the uplink CC for the feedback information. In one example of the criterion, a radio channel condition of each available uplink CCs may be used to determine the uplink CC to be used. In this way delays may be kept low in receiving feedback for downlink transmissions on the protocol bearer, while in the uplink direction data units of the RB may be transmitted on an uplink CC and to a network node considering the efficiency of the uplink transmissions, e.g. in terms of a delay, an error rate and/or a radio channel condition.

Accordingly, the uplink CC used for the feedback information may not be the same uplink CC as used for the other data units of the protocol bearer. For example, where the feedback information comprises e.g. an RLC Status PDU for one or more RLC PDUs received from MeNB, the RLC Status PDU may be transmitted on an uplink CC linked to the MeNB. In a similar manner, an RLC Status PDU for RLC PDUs received from SeNB may be transmitted on an uplink CC linked to the SeNB. However, an uplink CC for other RLC PDUs may be determined as in any of the embodiments described herein, so as to avoid unnecessary delays, e.g. due to the X2 connection between MeNB and SeNB, to the PDUs when delivering them. Furthermore, the an uplink CC to be used for the other data units than the feedback information may take benefit from better radio channel conditions available via either MeNB and SeNB, when the uplink CC to be used for the other data units is determined.

For example, where the UE is configured with a plurality of serving cells, e.g. PCell and SCell, an RLC Status PDU for RLC PDUs received 704 on a downlink CC of the PCell may be transmitted on an uplink CC of the PCell, and an RLC Status PDU for RLC PDUs received on a downlink CC of the SCell may be transmitted on an uplink CC of the SCell. In this way, e.g. in the independent RLC entities scenario described in FIG. 3b, the feedback information may be delivered directly to the network node terminating the protocol bearer without the delay of the X2 connection between the network nodes.

Information of the uplink CC linked to each of the MeNB and/or SeNB used in the transmitting 708, may be provided to the UE from the network, e.g. by the MeNB in a System Information message and control plane configuration message as explained in the above examples.

Accordingly, the uplink CC used to transmit 708 the feedback information may comprise the uplink CC of the network node where the data units for which feedback information is transmitted were received from. However, for other data units of the protocol bearer another uplink CC may be used, as determined in 706. In this way delays involved in delivering the feedback information to the network node terminating the associated protocol bearer may be kept low while also data units that are not related downlink transmission of data units, may be transmitted in uplink directly to the network node that terminates the protocol bearer. Thereby, the uplink data units may be delivered without involvement of the X2 delay between the MeNB and SeNB.

In an embodiment in 706, radio channel conditions of uplink CCs may be determined in 706. The determining may comprise determining for example Channel Quality Indicators (CQIs) of each uplink CC available to the UE. The CQI may be measured at the UE as is well-known in the art. The measuring may comprise e.g. an eNB (MeNB. SeNB) measuring a signal strength received in uplink from the UE. The results of the measurements may be received 704 by the UE, e.g. in an RRC message from the MeNB. In one example one or more RRC messages may be used to deliver one or more uplink CQI measurement results to the UE. The UE may determine 706 the network node terminating the protocol bearer and use the measurement results received in the message to determine 706 whether the CQI to determined network node is sufficient and if another uplink CC should be used. In one example another uplink CC of another network node than the one terminating all the protocol bearers may be used, when the CQI to that node is greater than the CQI to the network node terminating all the protocol bearers.

Accordingly, in 706, the UE may determine that a CQI of the network node terminating the protocol bearer is not sufficient. Then the UE may determine 706 that an uplink CC of the network node that does not terminate the protocol bearer for data units of the RB shall be used to transmit 708 the data units. In this way poor radio channel conditions may be taken into consideration when determining the uplink CC to be used. Indeed, an error rate experienced by the data units on the uplink to the network node terminating the protocol bearer may be high due to poor radio channel conditions and re-transmissions of the data units may be needed, which again may increase delays in delivering the data units on that path. Accordingly, when the measured radio channel conditions to the network node terminating all the protocol bearers, e.g. a MeNB, are worse than to the network node, e.g. SeNB, that does not terminate all the protocol bearers, the SeNB may provide a lower delay path for the uplink data units from the UE than the MeNB.

Information of the available uplink CCs may be obtained from the System Information and/or a control plane configuration messages as described earlier. The uplink CCs may comprise an uplink CC of each serving cell configured 702 in the UE, e.g. regardless which of the data-split options, e.g. the scenario of FIG. 3a or FIG. 3b, is used, when a protocol bearer is terminated at the MeNB. This may be applied to PDCP Status Reports as well as all uplink PDUs on Signalling Radio Bearers i.e. carrying RRC messages for radio-control signalling. Also in these cases, the possible ways to determine 706 the right uplink carrier are the same as identified in the above described embodiments.

In 710, the method may end after the data units of the protocol bearer have been transmitted to the network node terminating protocol bearer.

It should be appreciated that in the above described embodiments an uplink CC to be used at the UE may be preconfigured at the UE, for example as a configuration stored in a memory of the UE. Accordingly, it may not be necessary for a network and/or a network node to inform the UE about an uplink CC linked to one or more downlink CCs, as is described in the above e.g. by an example of a control plane configuration message informing about the uplink CC.

It should be appreciated that steps and processing related to feedback information of the above embodiments may be as well applied to any data units of a RB and/or any data units of a protocol bearer of RB. Indeed, an above described embodiment by an example of RLC PDUs and RLC Status PDUs, or by an example of PDCP PDUs and PDCP Status Report PDUs, may be applied to any protocol bearer of RB and corresponding feedback information of a protocol bearer.

The functions and/or steps in FIGS. 4, 5, 6, and 7 may be implemented as any kind of processor programmable to execute numeric calculations such as an embedded processor, a Digital Signal Processor (DSP), a Master Control Unit (MCU) or an Application Specific Integrated Processor (ASIP). An apparatus according to an embodiment may also be implemented as an electronic digital computer, which may comprise a working memory (RAM), a central processing unit (CPU) or a processor, and a system clock. The CPU may comprise a set of registers, an arithmetic logic unit, and a control unit. The control unit is controlled by a sequence of program instructions transferred to the CPU from the RAM. The control unit may contain a number of microinstructions for basic operations. The implementation of microinstructions may vary, depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

An embodiment provides a computer program embodied on a distribution medium, comprising program instructions which, when loaded into an electronic apparatus, constitute the apparatus according to an embodiment described earlier.

It should be appreciated that in the described embodiments instead of information regarding the reception of the transmitted data units of the air interface protocol, also other information may be transmitted. Indeed, the transmitted information may comprise any PDU of the air interface protocol. Thereby the described benefits related to each of the embodiments may be also provided to any air-interface protocol PDU transmitted on an uplink carrier to a network node that terminates the air-interface protocol.

The computer program may be in source code form, object code form, or in some intermediate form, and it may be stored in some sort of carrier, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital computer or processor or it may be distributed amongst a number of computers or processors.

The steps/points and related functions described above in FIGS. 4, 5, 6 and 7 are in no absolute chronological order, and some of the steps/points may be performed simultaneously or in an order differing from the given one. Other functions can also be executed between the steps/points or within the steps/points, and other signalling messages may be sent between the illustrated messages, and other transmissions of data may be sent between the illustrated transmissions. Some of the steps/points or part of the steps/points can also be left out or replaced by a corresponding step/point or part of the step/point.

The techniques described herein may be implemented by various means so that an apparatus implementing one or more functions described with an embodiment comprises not only prior art means, but also means for assembling data units of an air interface protocol at a first network node providing a first component carrier, means for transmitting a first part of the data units to user equipment on the first component carrier, means for transmitting a second part of the data units to the user equipment via a second network node on a second component carrier, means for receiving information regarding a reception of the first part of the data units and the second part of the data units on an uplink component carrier linked to the first component carrier.

According to another aspect the techniques described herein may be implemented by various means so that an apparatus implementing one or more functions described with an embodiment comprises not only prior art means, but also means for receiving data units from a first network node providing a first component carrier for delivering data units to user equipment, wherein the received data units are destined to user equipment via a second network node providing a second component carrier and connected to the first network node, means for assembling the received data units into data units of an air interface protocol, means for transmitting the assembled data units on the second component carrier to the user equipment, and means for receiving, via the first network node, information regarding the reception of the transmitted data units.

According to another aspect the techniques described herein may be implemented by various means so that an apparatus implementing one or more functions described with an embodiment comprises not only prior art means, but also means for receiving data units of an air interface protocol on a first component carrier provided by a first network node and on a second component carrier provided by a second network node, means for determining the network node of the first and the second network nodes that terminates the air-interface protocol, and means for transmitting data units of the air interface protocol on an uplink component carrier linked to the network node terminating the air-interface protocol.

According to another aspect the techniques described herein may be implemented by various means so that an apparatus implementing one or more functions described with an embodiment comprises not only prior art means, but also means for transmitting data units of an air interface protocol on a first component carrier of a first network node and on a second component carrier via a second network node connected to the first network node, means for receiving data units of the air interface protocol on an uplink component carrier linked to the first component carrier, when the air interface protocol terminates at the first network node, and on an uplink component carrier linked to the second component carrier, when the air interface protocol terminates at the second network node.

According to another aspect the techniques described herein may be implemented by various means so that an apparatus implementing one or more functions described with an embodiment comprises not only prior art means, but also means for providing a radio bearer to user equipment on a first component carrier by a first network node and on a second component carrier via a second network node connecting to the first network node, and receiving data units of the radio bearer on the first component carrier on the basis of the first network node terminating a protocol bearer of the radio bearer.

According to another aspect the techniques described herein may be implemented by various means so that an apparatus implementing one or more functions described with an embodiment comprises not only prior art means, but also means for receiving data units of a radio bearer from a first network node providing delivery of the data units of the radio bearer on a first component carrier to user equipment, wherein the received data units are destined to the user equipment via a second network node providing the radio bearer to user equipment on a second component carrier, transmitting the received data units on the second component carrier, and receiving, via the first network node terminating all protocol bearers of the radio bearer, information regarding the reception of the transmitted data units.

According to another aspect the techniques described herein may be implemented by various means so that an apparatus implementing one or more functions described with an embodiment comprises not only prior art means, but also means for determining a network node that terminates a protocol bearer of a radio bearer provided by a first network node on a first component carrier and on a second component carrier via a second network node connected to the first network node, and transmitting data units of the radio bearer on a component carrier of the network node that terminates the protocol bearer.

More precisely, the various means comprise means for implementing functionality of a corresponding apparatus described with an embodiment and it may comprise separate means for each separate function, or means may be configured to perform two or more functions. For example, these techniques may be implemented in hardware (one or more apparatuses), firmware (one or more apparatuses), software (one or more modules), or combinations thereof. For a firmware or software, implementation can be through modules (e.g., procedures, functions, and so on) that perform the functions described herein. The software codes may be stored in any suitable, processor/computer-readable data storage medium(s) or memory unit(s) or article(s) of manufacture and executed by one or more processors/computers. The data storage medium or the memory unit may be implemented within the processor/computer or external to the processor/computer, in which case it can be communicatively coupled to the processor/computer via various means as is known in the art.

It will be obvious to a person skilled in the art that, as the technology advances, the inventive concept can be implemented in various ways. The invention and its embodiments are not limited to the examples described above but may vary within the scope of the claims.

The invention claimed is:

1. A method comprising:
providing a radio bearer to user equipment on a first component carrier by a first network node and on a second component carrier via a second network node connected to the first network node; and
transmitting a control plane configuration message, said message indicating at least one uplink component carrier of a network node that terminates an air-interface protocol linked to at least one of the first and the second component carriers, wherein the at least one uplink component carrier is to be used in uplink transmission of data units comprising information regarding reception of data units of the air-interface protocol.

2. The method according to claim 1, further comprising:
receiving data units of the radio bearer on the second component carrier via the second network node on the basis of the second network node terminating a protocol bearer of the radio bearer.

3. The method according to claim 1, further comprising:
assembling data units of the radio bearer at a first network node providing a first component carrier;
transmitting a first part of the data units to user equipment on the first component carrier;
transmitting a second part of the data units to the user equipment via a second network node on a second component carrier; and
receiving information regarding a reception of the first part of the data units and the second part of the data units on an uplink component carrier linked to the first component carrier.

4. The method according to claim 1, further comprising:
allocating a sequence number to each data unit from a set of available sequence numbers of a sequence number space of a protocol entity of the radio bearer hosted by the first network node; and
updating the set of available sequence numbers on the basis of the received information indicating a successful delivery of the data units transmitted on the second component carrier.

5. The method according to claim 1, further comprising:
receiving data units of the protocol bearer from the user equipment on the indicated uplink carrier.

6. The method according to claim 1, further comprising:
assembling data units of the radio bearer at a first network node providing a first component carrier;
transmitting a first part of the data units to user equipment on the first component carrier;
transmitting a second part of the data units to the user equipment via a second network node on a second component carrier; and receiving information regarding a reception of the first part of the data units and the second part of the data units on an uplink component carrier linked to the first component carrier, wherein the data units transmitted on the first component carrier comprise control plane data units and user plane data units, and the data units transmitted on the second component carrier comprise user plane data units; and the data units of the radio bearer from the user equipment are received on an uplink component carrier linked to the first component carrier used for the control plane data units.

7. The method according to claim 1, further comprising: receiving data units of the protocol bearer on an uplink component carrier linked to a component carrier of a network node transmitting control plane data units to the user equipment.

8. The method according to claim 1, wherein the data units comprise data units of at least one of a group comprising a Radio Resource Control protocol, a Radio Link Control protocol and a Packet Data Convergence Protocol.

9. The method according to claim 1, wherein the first network node comprises a master enhanced NodeB and the second network node comprises a slave enhanced NodeB, said master and slave enhanced node B providing user equipment an air interface comprising aggregated carriers comprising the first and the second component carriers.

10. A method comprising:
determining a network node that terminates a protocol bearer of a radio bearer provided by a first network node on a first component carrier and on a second component carrier via a second network node connected to the first network node, wherein the determining comprises receiving a control plane configuration message, said message indicating at least one uplink component carrier of a network node that terminates an air-interface protocol linked to at least one of the first component carrier and the second component carrier; and
transmitting unlink data units of the radio bearer on the at least one uplink component carrier.

11. The method according to claim 10, wherein the data units of the radio bearer are transmitted on a component carrier of the first network node, when the first network node terminates all protocol bearers of the radio bearer.

12. The method according to claim 10, further comprising: transmitting data units of the radio bearer on the second component carrier of the second network node, when the second network node terminates the protocol bearer of the radio bearer.

13. The method according to claim 10, wherein the radio bearer comprises a signalling radio bearer, and the network node terminating the protocol bearer is determined on the basis of the at least one component carrier on which the signalling radio bearer is received.

14. The method according to claim 10, wherein the first component carrier comprises a component carrier of a primary cell provided by the first network node and the second component carrier comprises a component carrier of a secondary cell provided by the second network node, and the data units are transmitted on an uplink component carrier of the primary cell.

15. The method according to claim 10, wherein the transmitted data units comprise information regarding a reception of the data units received on the first component carrier and a reception of the data units received on the second component carrier.

16. The method according to claim 10, wherein the data units comprise control plane data units and user plane data units, and the transmitted data units comprise information regarding a reception of the control plane data units on the first component carrier, and the user plane data units on the first component carrier and the second component carrier.

17. The method according to claim 10, wherein data units comprising information regarding a reception of the data units on the first component carrier and the second component carrier are transmitted to the network node hosting a protocol entity that originated each of the received data units and other data units of the protocol bearer are transmitted to the network node of the first and the second network nodes on the basis of another criterion.

18. The method according to claim 10, comprising:
determining an uplink radio channel condition of the first and the second network node and transmitting the data units of the radio bearer on an uplink carrier of the network node that does not terminate the protocol bearer of the radio bearer, when a radio channel condition of the network node terminating the protocol bearer is worse than the radio channel condition of the network node terminating the data units.

19. An apparatus comprising:
at least one processor; and
at least one memory including computer program code, the at least one memory and the computer program code configured to, with the at least one processor, cause the apparatus at least to:
provide a radio bearer to user equipment on a first component carrier by a first network node and on a second component carrier via a second network node connected to the first network node; and
transmit a control plane configuration message, said message indicating at least one uplink component carrier of a network node that terminates an air-interface protocol linked to at least one of the first and the second component carriers, wherein the at least one uplink component carrier is to be used in uplink transmission of data units comprising information regarding reception of data units of the air-interface protocol.

20. An apparatus according to claim 19, the apparatus being further caused to:
receive data units of the radio bearer on the second component carrier via the second network node on the basis of the second network node terminating a protocol bearer of the radio bearer.

21. An apparatus according to claim 19, the apparatus being further caused to:
assemble data units of the radio bearer at a first network node providing a first component carrier;
transmit a first part of the data units to user equipment on the first component carrier;
transmit a second part of the data units to the user equipment via a second network node on a second component carrier;
receive information regarding a reception of the first part of the data units and the second part of the data units on an uplink component carrier linked to the first component carrier.

22. The apparatus according to claim 19, the apparatus being further caused to:
receive data units of the protocol bearer from the user equipment on the indicated uplink carrier.

23. The apparatus according to claim 19, the apparatus being further caused to:

assemble data units of the radio bearer at a first network node providing a first component carrier;

transmit a first part of the data units to user equipment on the first component carrier;

transmit a second part of the data units to the user equipment via a second network node on a second component carrier;

receive information regarding a reception of the first part of the data units and the second part of the data units on an uplink component carrier linked to the first component carrier, wherein the data units transmitted on the first component carrier comprise control plane data units and user plane data units, and the data units transmitted on the second component carrier comprise user plane data units; and the data units of the radio bearer from the user equipment are received on an uplink component carrier linked to the first component carrier used for the control plane data units.

24. An apparatus comprising:

at least one processor; and at least one memory including computer program code, the at least one memory and the computer program code configured to, with the at least one processor, cause the apparatus at least to:

determine a network node that terminates a protocol bearer of a radio bearer provided by a first network node on a first component carrier and on a second component carrier via a second network node connected to the first network node, wherein the determining comprises receiving a control plane configuration message, said message indicating at least one uplink component carrier of a network node that terminates an air-interface protocol linked to at least one of the first component carrier and the second component carrier; and transmit uplink data units of the protocol bearer one the at least one uplink component carrier.

25. An apparatus according to claim 24, wherein the data units of the radio bearer are transmitted on a component carrier of the first network node, when the first network node terminates all protocol bearers of the radio bearer.

26. An apparatus according to claim 24, wherein the data units of the radio bearer are transmitted on the second component carrier of the second network node, when the second network node terminates the protocol bearer of the radio bearer.

27. An apparatus according to claim 24, wherein the radio bearer comprises a signalling radio bearer, and the network node terminating the protocol bearer is determined on the basis of the at least component carrier on which the signalling radio bearer is received.

28. An apparatus according to claim 24, wherein the apparatus is caused to:

receive data units of radio bearer on a first component carrier provided by a first network node and on a second component carrier provided by a second network node, wherein the data units comprise control plane data from one of the first and a second network node:

determine the network node of the first and the second network nodes, where the control plane data is received, as the network node that terminates the protocol bearer.

29. An apparatus according to claim 24, wherein the first component carrier comprises a component carrier of a primary cell provided by the first network node and the second component carrier comprises a component carrier of a secondary cell provided by the second network node, and the data units are transmitted on an uplink component carrier of the primary cell.

30. An apparatus according to claim 24 wherein the transmitted data units comprise information regarding a reception of the data units received on the first component carrier and a reception of the data units received on the second component carrier.

31. An apparatus according to claim 24, wherein the data units comprise control plane data units and user plane data units, and the transmitted data units comprise information regarding a reception of the control plane data units on the first component carrier, and the user plane data units on the first component carrier and the second component carrier.

32. An apparatus according to claim 24, wherein data units comprising information regarding a reception of the data units on the first component carrier and the second component carrier are transmitted to the network node hosting a corresponding peer protocol entity that originated each of the received data units and other data units of the protocol bearer are transmitted to the network node of the first and the second network nodes on the basis of another criterion.

33. An apparatus according to claim 24, wherein the apparatus is caused to:

determine an uplink radio channel condition of the first and the second network node and transmitting the data units of the radio bearer on an uplink carrier of the network node that does not terminate the protocol bearer, when a radio channel condition of the network node terminating the protocol bearer is less than the radio channel condition of the network node terminating the protocol bearer.

\* \* \* \* \*

UNITED STATES PATENT AND TRADEMARK OFFICE
CERTIFICATE OF CORRECTION

PATENT NO.         : 9,560,652 B2                                  Page 1 of 1
APPLICATION NO.    : 14/371206
DATED              : January 31, 2017
INVENTOR(S)        : Koskinen et al.

It is certified that error appears in the above-identified patent and that said Letters Patent is hereby corrected as shown below:

In Claim 10:
Column 29, Line 40, "unlink" should be deleted and -- uplink -- should be inserted.

Signed and Sealed this
Eighteenth Day of April, 2017

Michelle K. Lee
*Director of the United States Patent and Trademark Office*